US012791975B2

(12) United States Patent
Chiyoda et al.

(10) Patent No.: US 12,791,975 B2
(45) Date of Patent: Nov. 10, 2026

(54) IMAGE FORMING SYSTEM AND CHARGE ADJUSTING APPARATUS

(71) Applicant: CANON KABUSHIKI KAISHA, Tokyo (JP)

(72) Inventors: Yasuharu Chiyoda, Chiba (JP); Yutaka Kakehi, Chiba (JP); Ryosuke Tsuruga, Chiba (JP); Yasushi Takeuchi, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 19/042,145

(22) Filed: Jan. 31, 2025

(65) Prior Publication Data

US 2025/0251691 A1 Aug. 7, 2025

(30) Foreign Application Priority Data

Feb. 2, 2024 (JP) ................................ 2024-014965

(51) Int. Cl.
*G03G 15/00* (2006.01)

(52) U.S. Cl.
CPC ..... *G03G 15/6573* (2013.01); *G03G 15/5004* (2013.01); *G03G 15/5016* (2013.01); *G03G 15/6552* (2013.01); *G03G 15/80* (2013.01); *G03G 2215/00426* (2013.01)

(58) Field of Classification Search
CPC ........... G03G 15/6573; G03G 15/5004; G03G 15/5016; G03G 15/6552; G03G 15/80; G03G 2215/00426
See application file for complete search history.

(56) References Cited

U.S. PATENT DOCUMENTS

| | | | | |
|---|---|---|---|---|
| 2019/0170778 A1* | 6/2019 | Kitamura | ............... | G01N 33/50 |
| 2019/0171134 A1* | 6/2019 | Hano | ..................... | G03G 21/08 |
| 2019/0332047 A1* | 10/2019 | Okamoto | ................ | G06F 3/128 |
| 2021/0216027 A1* | 7/2021 | Tanaka | ............... | G03G 15/6573 |
| 2021/0389690 A1* | 12/2021 | Nagatomo | ......... | G03G 15/0283 |
| 2022/0100141 A1* | 3/2022 | Kuramoto | .......... | G03G 15/0266 |
| 2023/0168617 A1* | 6/2023 | Shida | ................ | G03G 15/1675 399/297 |

FOREIGN PATENT DOCUMENTS

| | | |
|---|---|---|
| JP | 2019-167169 A | 10/2019 |
| JP | 2023-098240 A | 7/2023 |

OTHER PUBLICATIONS

Co-pending U.S. Appl. No. 18/956,155, filed Nov. 22, 2024.

* cited by examiner

*Primary Examiner* — David H Banh
(74) *Attorney, Agent, or Firm* — Venable LLP

(57) ABSTRACT

A charge-eliminating apparatus includes a charge-eliminating member, a voltage applying unit, a setting unit for setting a value of a voltage applied to the charge-eliminating member by the voltage applying unit. A controller executes a changing process in which the value of a voltage to be output by the voltage applying unit is changed from the value of the voltage set by the setting unit during execution of a charge-eliminating operation in which the charge of a plurality of sheets is continuously eliminated by the charge-eliminating member. A selecting unit selects a first mode in which the changing process is performed during the execution of the charge-eliminating operation or a second mode in which the changing process is not performed during the execution of the charge-eliminating operation and the voltage is output by the voltage applying unit based on the value set by the setting unit.

24 Claims, 12 Drawing Sheets

IMAGE FORMING SYSTEM AND CHARGE ADJUSTING APPARATUS

FIELD OF THE INVENTION AND RELATED ART

The present invention relates to a charge-eliminating apparatus which eliminates electric charge of a sheet, an image forming system which forms an image on the sheet, and a charge adjusting apparatus which adjusts the electric charge of the sheet.

In Japanese Patent Application Laid-Open No. 2019-167169, a charge-eliminating apparatus provided with a charge-eliminating roll, which is a charge-eliminating member of contact type which contacts a sheet, and a charge-eliminator of corotron type, which is a charge-eliminator of non-contact type which does not contact the sheet, is disclosed. In the document, it is disclosed that determining a charge-eliminating voltage to be applied to the charge-eliminating roll based on surface potential of the sheet actually measured by using a surface potential meter (potential probe).

Since a work to measure the surface potential of the sheet and adjust the charge-eliminating voltage may be burdensome for a user, it has been considered to add a function which automatically corrects the charge-eliminating voltage during execution of a job. However, it can be assumed that there is a case in which the user does not want the automatic correction of the charge-eliminating voltage, or a case in which a value of the charge-eliminating voltage which is automatically corrected may deviate from an appropriate value.

SUMMARY OF THE INVENTION

An object of the present invention is to provide a charge-eliminating apparatus, an image forming system, and a charge adjusting apparatus capable of applying a voltage to a charge-eliminating member in an appropriate type.

According to an aspect of the present invention, there is provided a charge-eliminating apparatus comprising: a charge-eliminating member configured to eliminate charge of a sheet in contact with the sheet; a voltage applying unit configured to apply a voltage to the charge-eliminating member; a setting unit configured to set a value of the voltage applied to the charge-eliminating member by the voltage applying unit; a controller capable of executing a changing process in which a voltage to be output by the voltage applying unit is changed from the voltage set by the setting unit during execution of a charge-eliminating operation in which the charge of a plurality of sheets is continuously eliminated by the charge-eliminating member; and a selecting unit configured to select a first mode in which the changing process is performed during the execution of the charge-eliminating operation or a second mode in which the changing process is not performed during the execution of the charge-eliminating operation and the voltage is output by the voltage applying unit based on the value set by the setting unit.

According to another aspect of the present invention, there is provided an image forming system provided with an image forming apparatus for forming an image on a sheet and a charge-eliminating apparatus for eliminating charge of the sheet on which the image is formed by the image forming apparatus, the charge-eliminating apparatus comprising: a charge-eliminating member configured to eliminate charge of the sheet in contact with the sheet; a voltage applying unit configured to apply a voltage to the charge-eliminating member; a setting unit configured to set a value of the voltage applied to the charge-eliminating member by the voltage applying unit; a controller capable of executing a changing process in which the value of the voltage to be output by the voltage applying unit is changed from the value of the voltage set by the setting unit during execution of a charge-eliminating operation in which charge of a plurality of sheets are continuously eliminated by the charge-eliminating member; and a selecting unit configured to select a first mode in which the changing process is performed during the execution of the charge-eliminating operation or a second mode in which the changing process is not performed during the execution of the charge-eliminating operation and the voltage is output by the voltage applying unit based on the value set by the setting unit.

According to another aspect of the present invention, there is provided a charge adjusting apparatus comprising: a charge applying member configured to apply charge to a sheet in contact with the sheet; a voltage applying unit configured to apply a voltage to the charge applying member; a setting unit configured to set a value of the voltage applied to the charge applying member by the voltage applying unit; a controller capable of executing a changing process in which the value of the voltage to be output by the voltage applying unit is changed from the value of the voltage set by the setting unit during execution of a charge applying operation in which the charge is continuously applied to a plurality of sheets by the charge applying member; and a selecting unit configured to select a first mode in which the changing process is performed during the execution of the charge applying operation or a second mode in which the changing process is not performed during the execution of the charge applying operation and the voltage is output by the voltage applying unit based on the value set by the setting unit.

Further features of the present invention will become apparent from the following description of exemplary embodiments with reference to the attached drawings.

DESCRIPTION OF THE EMBODIMENTS

Hereinafter, Embodiments according to the present disclosure will be described with reference to the drawings.

Embodiment 1

Figure 1:
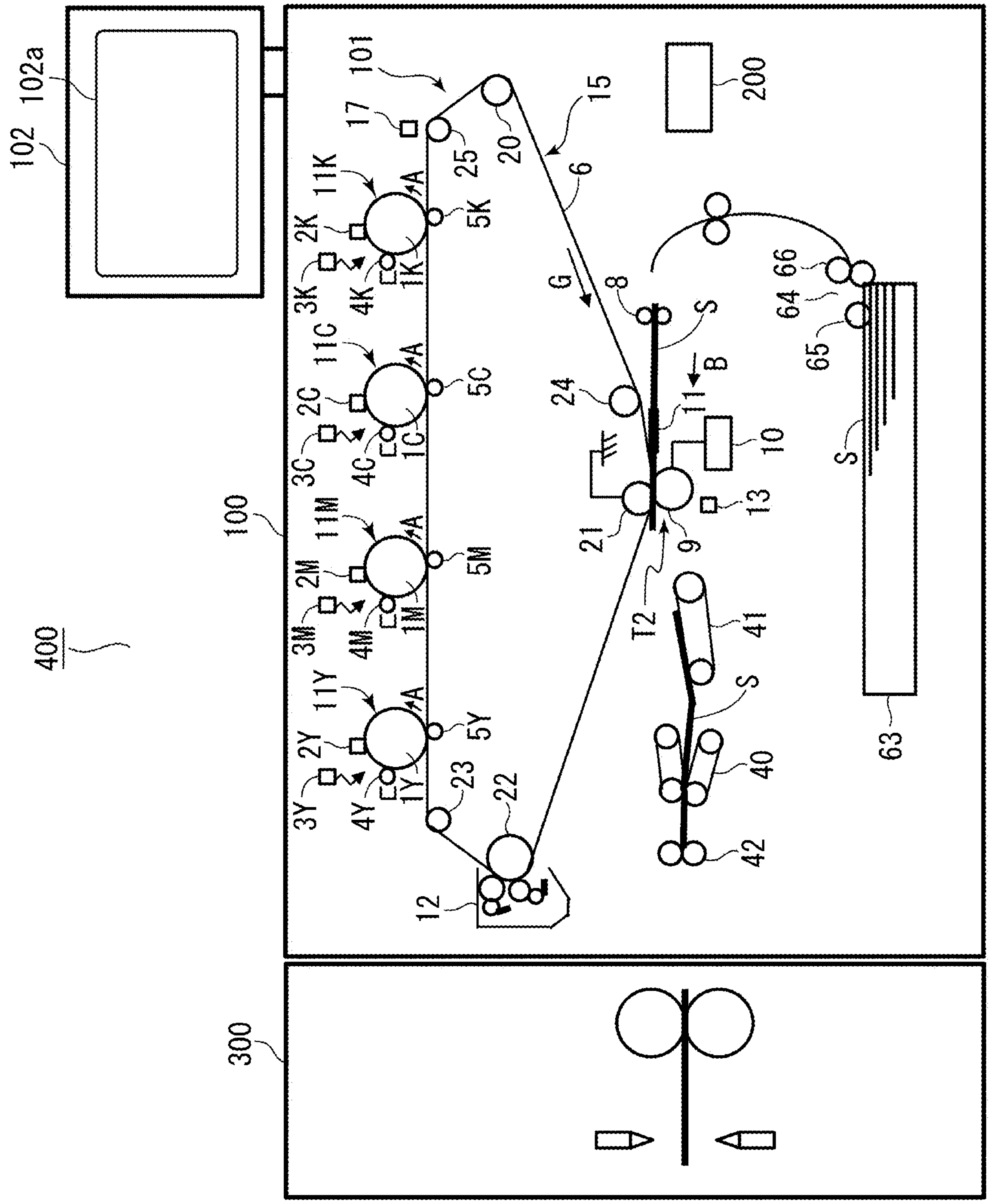
FIG. 1 is a schematic view of an image forming system according to an Embodiment 1.

In FIG. 1, a schematic view of an image forming system 400 according to an Embodiment 1 is illustrated. The image forming system 400 includes an image forming apparatus 100 (printer) and a charge-eliminating apparatus 300, which is connected to the image forming apparatus 100. The image forming system 400 forms an image on a sheet S and discharges the sheet S as a product (printed product). As the sheet S which is a recording material (recording medium), a variety of sheet material of different sizes and material may be used, for example, a paper such as a plain paper and a thick paper, sheet material onto which surface treatment is applied such as a coated paper, special shaped sheet material such as an envelope and an index paper, sheet material made of plastic, a cloth, etc. Examples of the sheet material made of plastic include a synthetic paper whose main raw material is synthetic resin and a sheet for an overhead projector (OHT).

The charge-eliminating apparatus 300 is an apparatus (static eliminator) which has a charge-eliminating function which eliminates (reduces) electric charge (charge) of the sheet S discharged from the image forming system 400. The charge-eliminating apparatus 300 may be referred to as a charge adjusting apparatus for adjusting a charged state of the sheet S discharged from the image forming system 400. The charge-eliminating apparatus 300 may have functions other than the charge-eliminating function (e.g., a decurler function to correct curling of the sheet S). In addition, the charge-eliminating apparatus 300 in the present Embodiment is disposed as an apparatus independent of the image forming apparatus 100, however, the charge-eliminating apparatus 300 may be incorporated in a housing of the image forming apparatus 100.

The image forming system 400 may include an optional apparatus other than the charge-eliminating apparatus 300. Examples of the optional apparatus include a high-capacity feeding apparatus (optional feeder), which supplies the sheet S to the image forming apparatus 100, and a sheet processing apparatus (finisher), which applies a process such as a binding process to the sheets S on which the images are formed by the image forming apparatus 100.

<Image Forming Apparatus>

An outline configuration of the image forming apparatus 100 is illustrated in FIG. 1. The image forming apparatus 100 includes an image forming portion 101, which is an electrophotographic mechanism of intermediary transfer type. The image forming portion 101 includes four process units 11Y, 11M, 11C and 11K, which include photosensitive drums 1Y, 1M, 1C and 1K, respectively, and a transfer unit 15, which includes an intermediary transfer belt 6 and a secondary transfer roller 9.

Each process unit includes the photosensitive drum as an image bearing member (latent image bearing member), a charging device, an exposure device and a developing device as a process portion which acts on the photosensitive drum to perform each process of electrophotographic processes. That is, the process unit 11Y includes the photosensitive drum 1Y, a charging device 2Y, an exposure device 3Y and a developing device 4Y The process unit 11M includes the photosensitive drum 1M, a charging device 2M, an exposure device 3M and a developing device 4M. The process unit 11C includes the photosensitive drum 1C, a charging device 2C, an exposure device 3C and a developing device 4C. The process unit 11K includes the photosensitive drum 1K, a charging device 2K, an exposure device 3K and a developing device 4K.

Each of the photosensitive drums 1Y, 1M, 1C and 1K is rotationally driven in a predetermined rotational direction A. The process units 11Y, 11M, 11C and 11K have substantially the same configurations, except that toner as developer accommodated in the developing devices 4Y, 4M, 4C and 4K is different from each other.

The transfer unit 15 includes the intermediary transfer belt 6 as an intermediary transfer member, the secondary transfer roller 9 as a transfer means (secondary transfer means), primary transfer rollers 5Y, 5M, 5C and 5K, a plurality of rollers 20, 21, 22, 23, 24 and 25 and a belt cleaner 12. The intermediary transfer belt 6 is stretched over the plurality of rollers 20, 21, 22, 23, 24 and 25. The primary transfer rollers 5Y, 5M, 5C and 5K are disposed on an inner surface side of the intermediary transfer belt 6 and at positions corresponding to the photosensitive drums 1Y, 1M, 1C and 1K, respectively. Between the primary transfer rollers 5Y, 5M, 5C and 5K and the corresponding photosensitive drums 1Y, 1M, 1C and 1K, primary transfer portions are formed. The roller 20 is a tension roller which applies appropriate tensile force to the intermediary transfer belt 6. The roller 22 is a driving roller which rotationally drives the intermediary transfer belt 6 in a predetermined rotational direction G. The secondary transfer roller 9 contacts an outer surface of the intermediary transfer belt 6 and disposed so as to nips the intermediary transfer belt 6 together with the opposite roller 21 (secondary transfer opposite roller). As a nip portion between the secondary transfer roller 9 and the intermediary transfer belt 6, a secondary transfer portion T2 as a transfer portion in which a toner image is transferred to the sheet S is formed.

The image forming apparatus 100 is provided with a transfer power source 10 as a voltage applying means to form a bias electric field for transferring the toner image in the secondary transfer portion T2. In the present Embodiment, the secondary transfer roller 9, which is an outer roller of the secondary transfer portion T2, is electrically connected to the transfer power source 10, and a predetermined transfer voltage is applied thereto from the transfer power source 10. The transfer voltage is a voltage having reverse polarity to normal charging polarity of the toner used for the image formation. On the other hand, the opposite roller 21, which is an inner roller of the secondary transfer portion T2, is electrically connected to ground potential GND (metal frame, etc.) of the image forming apparatus 100. Incidentally, the inner roller of the secondary transfer portion T2 may be connected to the transfer power source 10, and the outer roller of the secondary transfer portion T2 may be connected to the ground potential GND. In this case, a transfer voltage having the same polarity as the normal charging polarity of the toner is applied to the inner roller.

The image forming apparatus 100 further includes an accommodating portion 63 (storage, cassette), which accommodates the sheet S, a feeding unit 64, which feeds the sheet S, and a registration roller 8, which performs registration (positional alignment) of the sheet S. In addition, the image forming apparatus 100 includes a pre-fixing conveyance device 41, which conveys the sheet S which has passed through the secondary transfer portion T2, a fixing device 40, which fixes the toner image onto the sheet S, and a discharging roller pair 42 as a discharging unit, which discharges the sheet S outside the image forming apparatus 100.

The feeding unit 64 includes, for example, a pickup roller 65, which picks up an uppermost sheet S from the accommodating portion 63 in a sheet feeding direction, and a separating roller pair 66, which conveys the picked up sheet S while separating the sheet S one at a time. The separating roller pair 66 includes a conveyance roller, which conveys the uppermost sheet S in the sheet conveyance direction, and a separating roller, which is in contact with the conveyance roller and forms a separation nip together with the conveyance roller. The separating roller prevents a plurality of the sheets S from being conveyed by preventing the sheets S other than the uppermost sheet S from passing through the separation nip by applying frictional force to the sheet S in the separation nip. The separating roller is an example of a separating member which separates the sheets S and, for example, an elastic member having a pad shape (rubber pad) may be used as the separating member.

The fixing device 40 is a device of heat fixing type, which includes a fixing nip in which the toner image on the sheet S is heated while the sheet S is nipped and conveyed. The fixing device 40 includes a heating member, which contacts a surface of the sheet S on which the toner image is formed, a pressing member, which forms the fixing nip together with the heating member, and a heat source, which heats the heating member. For the heating member and the pressing member, for example, a belt member stretched over a plurality of rollers or a roller member having rigidity may be used. For the heat source, for example, a halogen lamp or an induction heating mechanism of IH type may be used.

In addition, the image forming apparatus 100 is also provided with a user operating portion 102, which is a user interface of the image forming system 400. The user operating portion 102 includes a display unit 102*a* such as a liquid crystal panel, which displays information to the user, and an input portion, such as a physical button and a touch panel function of the liquid crystal panel, which receives input of information from the user. The user can set setting information and execution conditions for image forming operation to the image forming system 400 by operating the user operating portion 102. The setting information is attribute information of the sheet S accommodated in the accommodating portion 63 such as, for example, a size, material and brand name. The execution conditions for image forming operation include, for example, a value of the transfer voltage.

Upon an execution instruction of the image formation being input from a user, a control portion of the image forming apparatus 100 starts an image forming job, which is a series of tasks in which while the sheet S is conveyed one at a time, the image is formed thereon and the product is output. Hereinafter, a series of operations in which the image is formed onto the sheet S by the image forming apparatus 100 is referred to as an image forming operation. The image forming job includes the image forming operation onto at least one sheet S.

In the image forming operation, the toner images of each color are formed in the process units 11Y, 11M, 11C and 11K. Specifically, the photosensitive drums 1Y, 1M, 1C and 1K are rotationally driven, and the charging devices 2Y, 2M, 2C and 2K uniformly charge the surfaces of the photosensitive drums 1Y, 1M, 1C and 1K, respectively. The exposure devices 3Y, 3M, 3C and 3K expose the photosensitive drums 1Y, 1M, 1C and 1K based on image information, which is input together with the execution instruction, and the electrostatic latent images are formed on the surfaces of the photosensitive drums 1Y, 1M, 1C and 1K, respectively. The developing devices 4Y, 4M, 4C and 4K supply the toner of yellow, magenta, cyan and black to the photosensitive drums 1Y, 1M, 1C and 1K to develop the electrostatic latent images into the toner images of each color, respectively.

Incidentally, in the present Embodiment, a reverse developing type is used. That is, after the charging device charges the surface of the photosensitive drum to the same polarity as the normal charging polarity of the toner, potential of an exposed area exposed by the exposure device is attenuated, and the toner adheres to the exposed area upon the development.

The toner images formed in each process unit 11Y, 11M, 11C and 11K are primary transferred from the photosensitive drums 1Y, 1M, 1C and 1K to the intermediary transfer belt 6 in the primary transfer portions. To the primary transfer rollers 5Y, 5M, 5C and 5K, the transfer voltage having the reverse polarity to the normal charging polarity of the toner is applied by constant voltage control.

In the present Embodiment, the primary transfer rollers 5Y, 5M, 5C and 5K are conductive rollers, which include a core metal and a conductive elastic layer formed on an outer periphery side of the core metal. The elastic layer is made of, for example, ion-conductive foam rubber. The ion-conductive foam rubber is foam rubber material in which a conductive agent, which manifests ion conductivity, is dispersed. For the conductive agent and the foam rubber material, known material for the transfer roller may be used. For each of the primary transfer rollers, for example, a roller which has an outer diameter from 15 to 20 mm and a resistance value from $1\times10^5$ to $1\times10^8\Omega$ when the voltage of 2 kV is applied under environment condition of 23° C. and 50% RH may be suitably used.

The intermediary transfer belt 6 is rotationally driven at a predetermined peripheral speed (process speed), which is equal to peripheral speeds of the photosensitive drums 1Y, 1M, 1C and 1K. In the present Embodiment, the peripheral speed is from 150 to 470 mm/sec. As the intermediary transfer belt 6 is rotated, by the toner image of another color being transferred over the toner image, which is transferred on an upstream side of the primary transfer portion, a full-color toner image is formed on the intermediary transfer belt 6. The full-color toner image is carried by the intermediary transfer belt 6 and conveyed toward the secondary transfer portion T2.

In parallel with the toner image formation in the image forming portion 101, the feeding unit 64 feeds the sheet S one at a time toward the image forming portion 101. The fed sheet S is conveyed to the secondary transfer portion T2 by the registration roller 8 in synchronization with a timing when the toner image on the intermediary transfer belt 6 is conveyed to the secondary transfer portion T2. Then, the toner image is transferred (secondary transfer) from the intermediary transfer belt 6 to the sheet S in the secondary transfer portion T2.

In the present Embodiment, the secondary transfer roller 9 is a conductive roller which includes a core metal and a conductive elastic layer formed on an outer periphery side of the core metal. The elastic layer is made of, for example, ion-conductive foam rubber. The ion-conductive foam rubber is foam rubber material in which a conductive agent, which manifests ion conductivity, is dispersed. For the conductive agent and the foam rubber material, known material for the transfer roller may be used. For the secondary transfer roller 9, for example, a roller which has an outer diameter from 20 to 25 mm and a resistance value from $1\times10^5$ to $1\times10^8\Omega$ when the voltage of 2 kV is applied under environment condition of 23° C. and 50% RH may be suitably used.

In addition, the opposite roller 21 is a conductive roller which includes a core metal and an elastic layer of electroconductive foam rubber formed on an outer periphery side of the core metal. The electroconductive foam rubber is foam rubber material in which a conductive agent, which manifests electron conductivity, is dispersed. For the conductive agent and the foam rubber material, known material for the transfer roller may be used. For the opposing roller 21, for example, a roller which has an outer diameter from 20 to 22 mm and a resistance value from $1\times10^5$ to $1\times10^8\Omega$ when the voltage of 50 V is applied under environment condition of 23° C. and 50% RH may be suitably used.

During the secondary transfer, to the secondary transfer roller 9, the transfer voltage having the reverse polarity to the normal charging polarity of the toner is applied from the transfer power source 10 by the constant voltage control. The transfer voltage is, for example, from +1 to +7 kV and is automatically adjusted so that current from +40 to +120 μA flows from the secondary transfer roller 9 to the opposite roller 21. By the application of the transfer voltage, the bias electric field is formed in the secondary transfer portion T2, in which potential of the secondary transfer roller 9 becomes reverse polarity to the normal charging polarity of the toner with respect to the intermediary transfer belt 6. By this bias electric field, electrostatic force in a direction approaching to the secondary transfer roller 9 is acted on the toner on the intermediary transfer belt 6. Then, by the toner being transferred from the intermediary transfer belt 6 to the sheet S passing through the secondary transfer portion T2, the toner image is transferred to the sheet S.

Incidentally, just before the secondary transfer portion T2, a conveyance guide 11 is provided to improve positioning accuracy of the sheet S with respect to the intermediary transfer belt 6. In addition, transfer residual toner which remains on the intermediary transfer belt 6 without being transferred to the sheet S is collected by the belt cleaner 12 and reused for the image formation.

The sheet S having passed through the secondary transfer portion T2 is conveyed to the fixing device 40 by the pre-fixing conveyance device 41, and the toner image is subjected to a fixing process by the fixing device 40. The fixing process is a process in which the toner image on the sheet S is heated and pressed while the sheet S is nipped and conveyed in the nip portion of the fixing device 40. The pre-fixing conveyance device 41 carries and conveys the sheet S on an endless rubber belt, for example. For the rubber belt, ethylene propylene diene rubber (EPDM) having a width from 100 to 110 mm and a thickness from 1 to 3 mm may be used. In addition, the rubber belt has holes having a diameter from 3 to 7 mm, and by generating negative pressure inside the rubber belt using a fan, the sheet S can be stably carried on the rubber belt.

The sheet S, which has passed through the fixing device 40, is discharged by the discharging roller pair 42 toward the charge-eliminating apparatus 300.

The image forming portion 101 of intermediary transfer type described above is an example of an image forming means which forms the image on the sheet S, and the image forming means may be an electrophotographic unit of direct transfer type, for example. In this case, the toner image formed on the photosensitive drum as the image bearing member is directly transferred from the photosensitive drum to the sheet S in a transfer nip (transfer portion) in which the photosensitive drum and the transfer roller are opposite to each other. In the transfer nip, a bias electric field, in which potential of the transfer roller becomes the reverse polarity to the normal charging polarity of the toner with respect to the photosensitive drum, is formed.

<Charge-Eliminating Apparatus>

Figure 2:
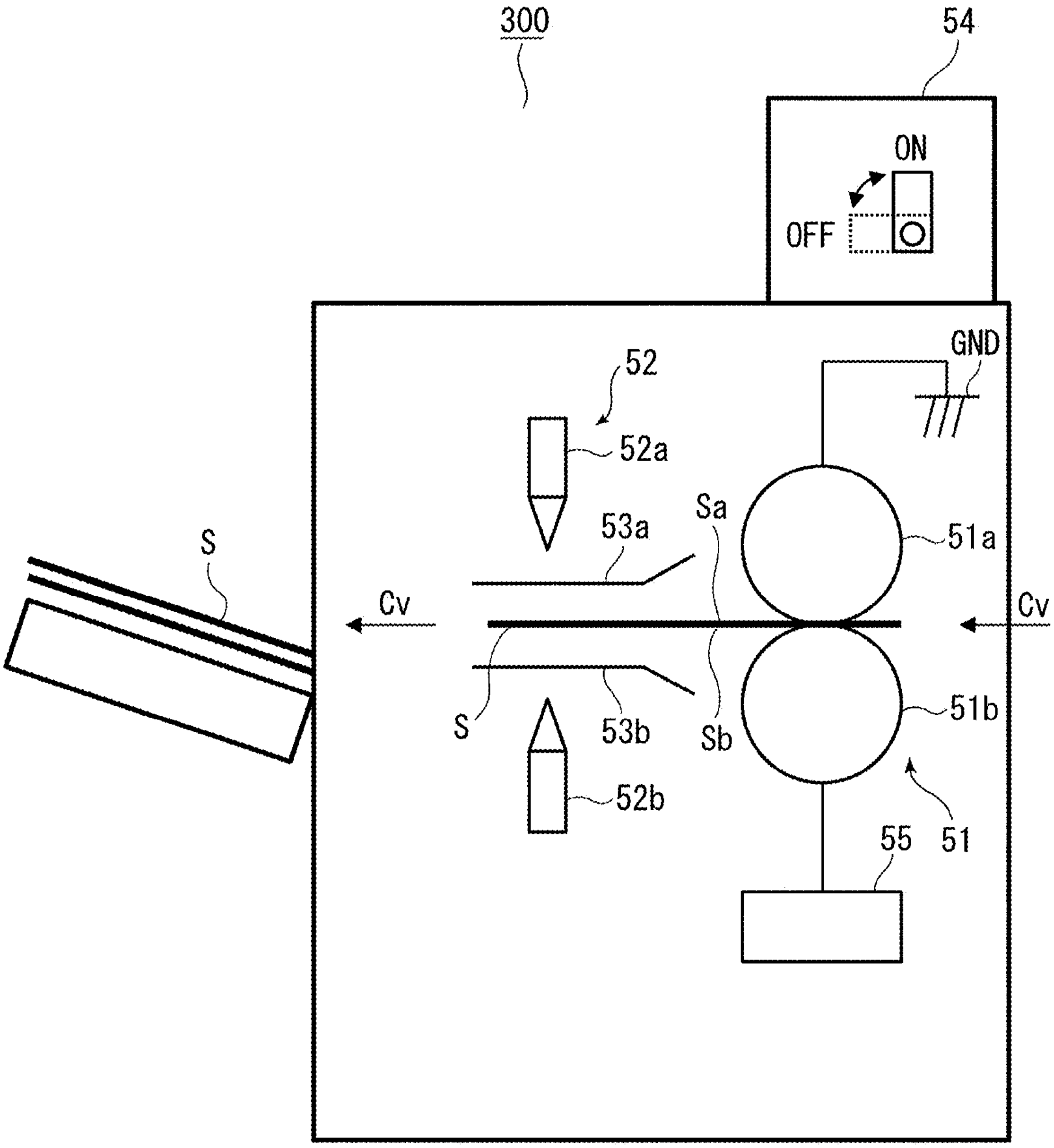
FIG. 2 is a schematic view of a charge-eliminating apparatus according to the Embodiment 1.

FIG. 2 is a schematic view of the charge-eliminating apparatus 300 in the Embodiment 1. In the present Embodiment, the charge-eliminating apparatus 300 is connected to a downstream side of the image forming apparatus 100. The charge-eliminating apparatus 300 performs charge-eliminating of the sheet S (reducing electrostatic charge on the sheet surface) while receiving the sheet S on which the image has been formed by the image forming apparatus 100 and conveying the sheet S to a sheet conveyance direction Cv. That is, the charge-eliminating apparatus 300 performs a charge-eliminating operation, in which charge of a plurality of the sheets is continuously eliminated, in the image forming job, in which the image formation is performed on the plurality of the sheets. By performing the charge-eliminating of the sheet S, it becomes possible to prevent the sheets, which are discharged and stacked from the image forming system 400, from sticking to each other due to electrostatic adsorption force, and to suppress occurrence of deterioration in alignment of the sheets due to the sticking between the sheets. The charge-eliminating apparatus 300 is provided with a charge-eliminating roller pair 51 as a charge-eliminator of contact type and an ionizer portion 52 as a charge-eliminator of non-contact type.

The charge-eliminating roller pair 51 includes a charge-eliminating opposite roller 51*a*, which contacts a first surface Sa of the sheet S, and a charge-eliminating roller 51*b*, which contacts a second surface Sb opposite to the first surface Sa of the sheet S. The charge-eliminating roller 51*b* is a charge-eliminating member of contact type which contacts the conveyed sheet S and eliminates the charge of the sheet S. The charge-eliminating opposite roller 51*a* is in contact with the charge-eliminating roller 51*b*, and a charge-eliminating nip as a nip portion between the charge-eliminating roller 51*b* and the charge-eliminating opposite roller 51*a* is formed. The charge-eliminating roller pair 51 performs the charge-eliminating of the sheet S while nipping and conveying the sheet S in the charge-eliminating nip.

The charge-eliminating opposite roller 51*a* is connected to the ground potential GND. The charge-eliminating opposite roller 51*a* is electrically connected to, for example, the metal frame of the charge-eliminating apparatus 300 and is electrically grounded. The charge-eliminating roller 51*b* is connected to a high voltage power source 55. The high voltage power source 55 is a voltage applying means which applies a voltage (charge-eliminating voltage) for perform the charge-eliminating of the sheet S to the charge-eliminating roller 51*b*.

Incidentally, it may be configured that the charge-eliminating roller 51*b* is disposed so as to contact the first surface Sa of the sheet S and the charge-eliminating opposite roller 51*a* is disposed so as to contact the second surface Sb of the sheet S. In that case, a voltage applied to the charge-eliminating roller 51*b* becomes reverse polarity to the voltage applied to the charge-eliminating roller 51*b* in the present Embodiment.

In the present Embodiment, the charge-eliminating roller 51*b* is a conductive roller which includes a core metal and a conductive elastic layer formed on an outer periphery side of the core metal. The elastic layer is made of, for example, ion-conductive foam rubber. The ion-conductive foam rubber is foam rubber material in which a conductive agent, which manifests ion conductivity, is dispersed. For the conductive agent and the foam rubber material, known material may be used. For the charge-eliminating roller 51*b*, for example, a roller which has an outer diameter from 20 to 25 mm and a resistance value from $1\times10^5$ to $1\times10^8\Omega$ when the voltage of 2 kV is applied under environment condition of 23° C. and 50% RH may be suitably used. The charge-eliminating opposite roller 51*a* is made of stainless steel (SUS), and, for the charge-eliminating opposite roller 51*a*, a roller which has an outer diameter from 20 to 25 mm is used. Incidentally, for the charge-eliminating roller 51*b*, a roller made of metal such as stainless steel may be used.

The ionizer portion 52 includes a first ionizer 52*a* opposing the first surface of the sheet S and a second ionizer 52*b* opposing the second surface of the sheet S. Each of the first ionizer 52*a* and the second ionizer 52*b* includes an electrode needle, and by applying voltage to the electrode needle, corona electric discharge is generated from a tip of the needle, causing air around the tip of the needle to be ionized. Then, by the generated ions neutralizing the electric charge on the surface of the sheet S, the charge of the sheet S is eliminated.

Figure 3:
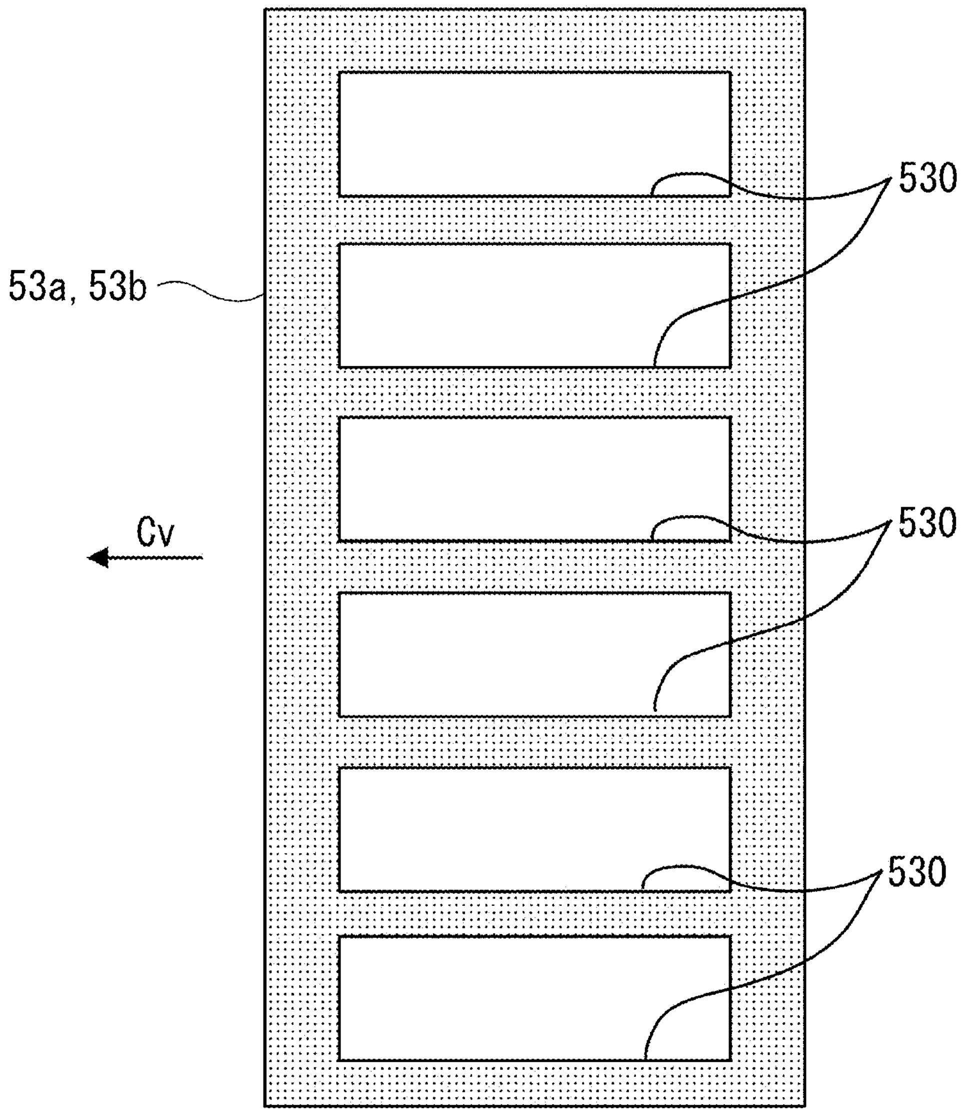
FIG. 3 is a schematic view of a conveyance guide according to the Embodiment 1.

As the ionizer portion 52 in the present Embodiment, bar type ionizers IZS40 (manufactured by SMC Corporation) are disposed above and below a sheet conveyance path as the first ionizer 52*a* and the second ionizer 52*b*. Conveyance guides 53*a* and 53*b*, which form the sheet conveyance path in the ionizer portion 52, are made of, for example, resin synthesized from PC (polycarbonate) and ABS (acrylonitrile-butadiene-styrene). Volume resistivities of the conveyance guides 53*a* and 53*b* are, for example, $1\times10^{14}$ Ωcm. Furthermore, as shown in FIG. 3, to each of the conveyance guides 53*a* and 53*b*, a plurality of holes 530 in order for the ions emitted from the first ionizer 52*a* and the second ionizer 52*b* not to be physically shielded are formed. The plurality of holes 530 are disposed side by side in a sheet widthwise direction, which is perpendicular to the sheet conveyance direction Cv.

The first ionizer 52*a* and the second ionizer 52*b* described above are examples of the charge-eliminator of non-contact type, and other charge-eliminators of non-contact type may be used. For example, a charge-eliminator of corotron type or scorotron type, which eliminates charge of a sheet by corona electric discharge from an electric discharging wire, may be used. In addition, it is not necessarily for the charge-eliminator of non-contact type to be provided on both sides of the conveyance path but, for example, it may be a configuration in which the charge-eliminating apparatus 300 includes only the first ionizer 52*a* as the charge-eliminator of non-contact type. In addition, in a case in which the charge of the sheet S can be sufficiently eliminated by the charge-eliminating roller 51*b*, the charge-eliminator of non-contact type may be omitted.

For the sheet S conveyed from the image forming apparatus 100 to the charge-eliminating apparatus 300, firstly most of the electric charge thereof is removed (roughly removed) by the charge-eliminating nip of the charge-eliminating roller pair 51. Specifically, the charge-eliminating voltage is set to reverse polarity to the transfer voltage, which is applied to the secondary transfer roller 9. A value of the charge-eliminating voltage is set in a range from −1 kV to −6 kV.

In the secondary transfer portion T2 (FIG. 1), normally, the sheet S is charged so that the first surface Sa of the sheet S, which has contacted the intermediary transfer belt 6, becomes negative polarity, and the second surface Sb, which has contacted the secondary transfer roller 9, becomes positive polarity. By the charge-eliminating voltage of the reverse polarity to the transfer voltage being applied to the charge-eliminating roller 51*b*, between the charge-eliminating roller 51*b* and the charge-eliminating opposite roller 51*a*, current flows so that positive electric charge is supplied to the first surface Sa of the sheet S and negative electric charge is supplied to the second surface Sb. In this manner, by the current flowing via the sheet S in the charge-eliminating nip by the application of the charge-eliminating voltage to the charge-eliminating roller 51*b*, an electrification charge amount of the sheet S, which is an amount of the charge beard on the first surface Sa and the second surface Sb of the sheet S, is reduced.

The sheet S, which has passed through the charge-eliminating roller pair 51, is further subject to charge-eliminating in the ionizer portion 52. Specifically, by the ions being irradiated from the first ionizer 52*a* and the second ionizer 52*b*, residual charge on the first surface Sa and the second surface Sb of the sheet S is neutralized, and the electrification charged amount of the sheet S is further reduced. The sheet S which has passed through the ionizer portion 52 is discharged outside of the charge-eliminating apparatus 300.

Incidentally, the electrification charge amount of the sheet S and surface potential of the sheet S are usually proportional. In addition, the electrification charge amount of the sheet S may be expressed as an amount of electric charge per unit area of the sheet surface (surface electric charge density). Therefore, the "electrification charge amount" of the sheet S in the description below may be replaced to the surface potential of the sheet S or the surface electric charge density of the sheet S.

<Charge-Eliminating Voltage Adjusting Switch>

Figure 4:
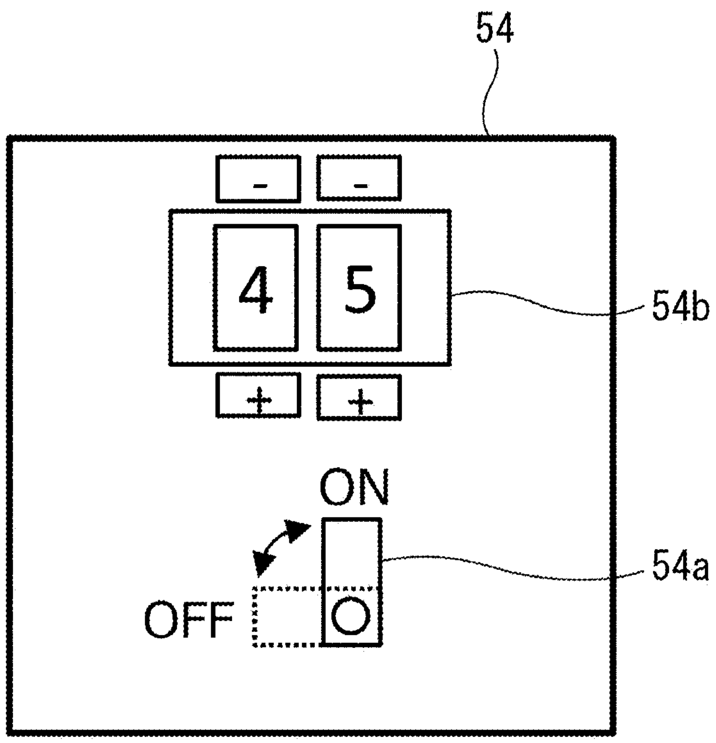
FIG. 4 is a view illustrating an operating portion for charge-eliminating according to the Embodiment 1.

The charge-eliminating apparatus 300 is provided with an operating portion for charge-eliminating 54 which is capable of operation to change operating conditions for the charge-eliminating apparatus 300. In FIG. 4, an enlarged view of the operating portion for charge-eliminating 54 is illustrated. The operating portion for charge-eliminating 54 is an example of an inputting means for a user to input the value of the voltage to be applied to the charge-eliminating roller 51*b* (charge-eliminating member) by the high voltage power source 55 (voltage applying means).

The operating portion for charge-eliminating 54 includes a changeover switch 54*a* and a voltage adjusting switch 54*b*. By operating the changeover switch 54*a*, the user can switch between output (ON) and stop outputting (OFF) of the charge-eliminating voltage by the high voltage power source 55 (FIG. 2), which applies the charge-eliminating voltage to the charge-eliminating roller 51*b*. The voltage adjusting switch 54*b* allows the user to adjust the value of the charge-eliminating voltage.

The value of the charge-eliminating voltage may be fixed at a value set in advance corresponding to a category of the sheet S. For example, in a case of a plastic film or a synthetic paper, it is known that it is likely for those sheets to be dielectrically polarized more strongly in the secondary transfer portion than a plain paper and for the electrification charge amount of the sheet S to become larger. Therefore, in a case in which the plastic film or the synthetic paper is used as the sheet S, it may be considered that the value of the charge-eliminating voltage is set in advance according to the category of the sheet S so that the charge-eliminating voltage is higher voltage (so as an absolute value thereof to be large) than a case in which the plain paper is used as the sheet S. However, even for the sheet S in the same category, there are cases in which an appropriate value of the charge-eliminating voltage fluctuates due to a difference in electric resistance caused by a difference in specific material, a difference in a thickness and a difference in use environment, etc. Therefore, in the present Embodiment, it is configured that the value of the charge-eliminating voltage is adjustable.

The voltage adjusting switch 54*b* in the present Embodiment includes a display portion, which displays the value of the charge-eliminating voltage in two digits, and buttons (+ button and − button) to increase or decrease the value of the charge-eliminating voltage. Upon pressing the + button, a number in a corresponding digit is increased, and upon pressing the − button, a number in a corresponding digit is decreased.

The value displayed in the display portion is what displays an absolute value of the charge-eliminating voltage as a two-digit number in a unit of 0.1 kV. That is, what multiplies −0.1 kV to the value displayed in the display portion of the voltage adjusting switch 54*b* is the set value for the charge-eliminating voltage. For example, in a case in which "45" is displayed in the display portion of the voltage adjusting switch 54*b*, the set value for the charge-eliminating voltage is −4.5 kV. From this state, upon pressing the − button in a tens place once and the + button in a ones place twice, the display becomes "37" and the value of the charge-elimination voltage is set to −3.7 kV.

Incidentally, in a case in which the display is set to "00" by the voltage adjusting switch 54*b*, the set value for the charge-eliminating voltage becomes 0 V (0.0 kV). In this case, a state of the high voltage power source 55 becomes the same state as when the changeover switch 54*a* is turned off. This state may also be referred to as a state in which the high voltage power source 55 applies 0 V to the charge-eliminating roller 51*b*.

Incidentally, a display type and an input type of the value of the charge-eliminating voltage is not limited to those described above. Instead of displaying upper two digits of the value of the charge-eliminating voltage, the value of the charge-eliminating voltage itself may be displayed, or a numerical value which represents a level of the charge-eliminating voltage, for example, in 10 levels may be displayed. The value of the charge-eliminating voltage may be displayed, for example, on a screen of the user operating portion 102 or of an external computer communicably connected to the image forming system 400. As the input type of the value of the charge-eliminating voltage, a numeric keypad for numerical input may be provided to the operating portion for charge-eliminating 54, or by a touch panel operation of the user operating portion 102, or it may be configured to receive an input via the external computer. The user operating portion 102 which can display a screen for inputting the charge-eliminating voltage is another example of the inputting means for the user to input the value of the charge-eliminating voltage to be applied to the charge-eliminating roller 51*b* (charge-eliminating member) by the high voltage power source 55 (voltage applying means).

<Factors Causing Fluctuation of an Appropriate Charge-Eliminating Voltage>

By the way, when the application of the voltage to the charge-eliminating roller 51*b* is continuously performed, the resistance value of the charge-eliminating roller 51*b* may change. For example, as in the present Embodiment, in a case in which a conductive roller which contains an ion-conductive conductive agent is used as the charge-eliminating roller 51*b*, the resistance value may change by distribution of the conductive agent in the roller being deviated due to the continuous energization. In this case, if the set value for the charge-eliminating voltage, which is set via the operating portion for charge-eliminating 54 in a state before the resistance value of the charge-eliminating roller 51*b* changes, continues to be used, since the resistance value of the charge-eliminating roller 51*b* has been changed, there is a possibility that the charge-eliminating roller 51*b* cannot properly eliminate the charge of the sheet S. That is, due to the change in the resistance value of the charge-eliminating roller 51*b*, by an electric charge applying (supplying) ability from the charge-eliminating roller 51*b* to the sheet S being affected, an excess or a deficiency in an amount of the electric charge, which is actually supplied to the sheet S, relative to an amount of the electric charge, which is required to eliminate the charge of the sheet S, may occur.

In addition, also due to an environment condition (in particular, temperature and humidity) of an environment in which the charge-eliminating apparatus 300 is installed, the value of the transfer voltage applied in the secondary transfer portion T2 and/or a resistance value of the sheet S (likeliness of accumulation of the electric charge on the sheet surface) may also change. Therefore, the excess or the deficiency in the amount of the electric charge, which is actually supplied to the sheet S, relative to the amount of the electric charge, which is required to eliminate the charge of the sheet S, may occur.

<Automatic Correction of the Charge-Eliminating Voltage>

In the present Embodiment, in order to deal with the possibility that an excess or a deficiency in a charge-eliminating ability of the charge-eliminating roller 51*b* occurs due to the factors as described above, a function which performs a feedback control (automatic correcting function), which automatically corrects the charge-eliminating voltage during an execution of a job, is provided.

Figure 5:
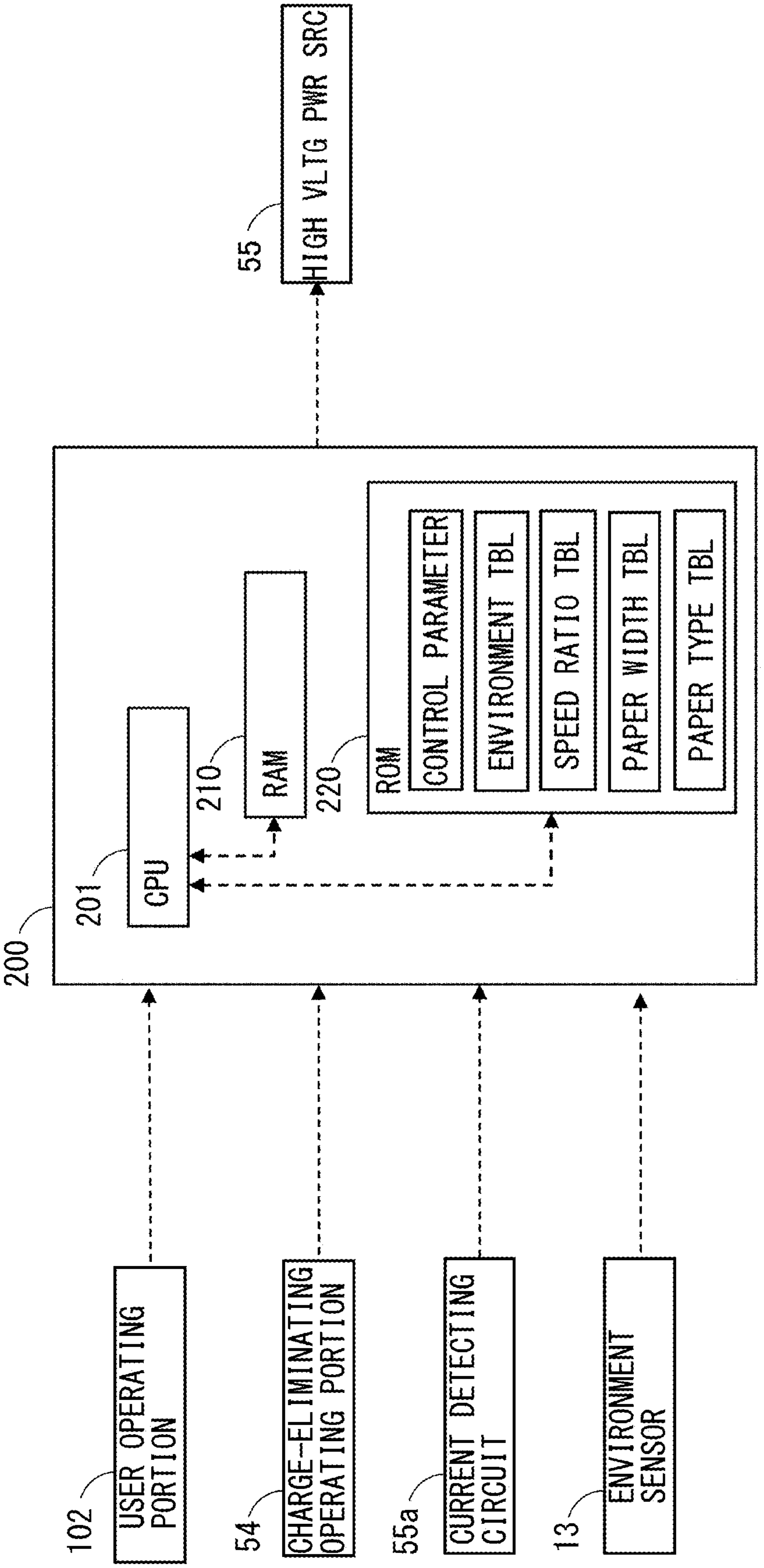
FIG. 5 is a block diagram of a control system according to the Embodiment 1.

In FIG. 5, a block diagram of a control circuit 200 related to control of the charge-eliminating voltage is illustrated. The control circuit 200 is an example of a control means which controls an operation of the charge-eliminating apparatus 300. The control circuit 200 may be mounted in a main assembly of the charge-eliminating apparatus 300, or a part or all of functions of the control circuit 200 may be installed in the image forming apparatus 100.

As shown in FIG. 5, the control circuit 200 includes a CPU 201, a RAM 210 and a ROM 220. The CPU 201 is an executing means which reads out and executes control programs. The RAM 210 provides a working area upon the CPU 201 executing the control programs. The ROM 220 is an example of a memory portion which memorizes various types of information such as setting information related to control of the charge-eliminating apparatus 300. In addition, the control circuit 200 is connected to the user operating portion 102, an operating portion for charge-eliminating 54, the high voltage power source 55 and the transfer power source 10. Inside the high voltage power source 55, a current detecting circuit 55*a*, which detects the current supplied from the high voltage power source 55 to the charge-eliminating roller 51*b*, is provided. The current detecting circuit 55*a* functions as a current detecting means for detecting the current flowing through the charge-eliminating roller 51*b* (charge-eliminating member).

The CPU 201 acquires information such as information related to the image forming job (job information), a set value of the charge-eliminating voltage, a value of the current which flows through the charge-eliminating roller 51*b* upon the charge-eliminating voltage being applied (referred to as a charge-eliminating current), and a value of the transfer voltage which is output by the transfer power source 10, and memorizes the information in the RAM 210. Here, the job information is, for example, attribute information of the sheet S which is input by a user via the user operating portion 102 and is used for a current image forming job. The set value of the charge-eliminating voltage is a value set by the user through an operation of the operating portion for charge-eliminating 54. The value of the charge-eliminating current is a value detected by the current detecting circuit 55*a*. In a case of a period when the sheet S is passing through the charge-eliminating nip (during paper passing), the value of the charge-eliminating current corresponds to an amount of electric charge supplied from the charge-eliminating roller 51*b* to the sheet S per unit time. The CPU 201 calculates a corrected charge-eliminating voltage based on the information stored in the RAM 210 and a control condition, which will be described below and is stored in the ROM 220, and performs feedback control, which controls the output of the high voltage power source 55 based on the corrected charge-eliminating voltage.

In addition, the control circuit 200 is connected to an environment sensor 13 for detecting the environment condition of the installed environment (a space surrounding where the apparatus is installed) of the charge-eliminating apparatus 300 (image forming system 400). Control using the environment sensor 13 will be described in an Embodiment 2. In addition, in the ROM 220, control parameters and various types of tables, which are used for the control of the charge-eliminating voltage, are stored.

A control procedure of the charge-eliminating voltage performed by the control circuit 200 will be described according to a flowchart in FIG. 6. Hereinafter, an executing entity for each process in the present flow is, unless otherwise specified, the CPU 201.

When the image forming job is input to the image forming system 400, a process of the present flow is started. First, the CPU 201 checks that a setting method of the charge-eliminating voltage is either of three modes (automatic correction, manual setting, media setting), which the image forming apparatus 100 of the present Embodiment is capable of executing (S0).

The automatic correction mode is an example of a first mode in which the value of the voltage output by the high voltage power source 55 (voltage applying means) is automatically changed during the execution of the job. Both the manual setting mode and the media setting mode are examples of a second mode, in which the value of the voltage output by the high voltage power source 55 (voltage applying means) is not automatically changed during the execution of the job, but the voltage is output based on a value input through the operating portion for charge-eliminating 54 or the user operating portion 102 (inputting means).

As described above, in the present Embodiment, as the second mode, two control modes of a control mode in which the charge-eliminating voltage is determined regardless of a type of the sheet (manual setting mode) and a control mode in which the charge-eliminating voltage is determined based on the type of the sheet (media setting mode) are prepared. Not limited thereto, however, it may be a configuration in which the control circuit 200 is capable of executing one of a plurality of control modes, which includes at least one of the manual setting mode and the media setting mode.

(Manual Setting Mode)

In a case of the manual setting mode, the CPU 201 acquires the set value of the charge-eliminating voltage which is adjusted by a user in advance (Sa1). An example of an adjusting flow for the charge-eliminating voltage by the user will be described below, and, here, it is assumed that the adjusted set value is stored in a memory unit such as the RAM 210 in advance. In the manual setting mode, regardless of the type of the sheet used for the job, the value of the charge-eliminating voltage, which is set by the operating portion for charge-eliminating 54 before the start of the job, is applied. The CPU 201 causes the high voltage power source 55 to output the charge-eliminating voltage at the set value acquired in Sa1, and causes the charge-eliminating roller 51*b* to eliminate the charge of the sheet S (Sa2).

In addition, the set value of the charge-eliminating voltage is changeable during the execution of the job. That is, during the execution of the job in which the images are continuously formed on a plurality of the sheets S (continuous print job), in a case in which the user changes the set value of the charge-eliminating voltage by operating the voltage adjusting switch 54*b* of the operating portion for charge-eliminating 54 or in a case in which the user switches ON/OFF of the changeover switch 54*a*, the CPU 201 continues the job based on the changed setting. In other words, in the manual setting mode, which is one example of the second mode, in the case in which the operating portion for charge-eliminating 54 (inputting means) is operated after the start of the job, the CPU 201 changes the value of the voltage to be output by the high voltage power source 55 (voltage applying means) from the value input through the operating portion for charge-eliminating 54 before the start of the job to the value input through the operating portion for charge-eliminating 54 after the start of the job.

In Sa3, the CPU 201 determines whether or not a current sheet S is a last sheet in the image forming job, and if the current sheet S is not the last sheet (Sa3N), then the CPU 201 returns the process to Sa1 and repeats the same process for the following sheet S. If the current sheet S is the last sheet (Sa3Y), then the CPU 201 ends the process.

(Media Setting Mode)

In a case of the media setting mode, the CPU 201 acquires the job information and checks the type of the sheet S to be used for a current job (Sb1). Then, the CPU 201 acquires a set value of the charge-eliminating voltage corresponding to the sheet S to be used for the current job from the setting information (media information), which is set for each type of the sheet in advance (Sb2). A setting of the media information by the user will be described below, and, here, it is assumed that the media information for each type of the sheet, which includes the set value of the charge-eliminating voltage, is stored in the RAM 210 in advance. The RAM 210 is an example of a memory unit which memorizes the value of the voltage set in advance through the user operating portion 102 (inputting means) for each type of the sheet. The CPU 201 causes the high voltage power source 55 to output the charge-eliminating voltage by the set value acquired in Sb2, and causes the charge-eliminating roller 51*b* to eliminate the charge of the sheet S (Sb3). In other words, in the media setting mode, which is one example of the second mode, the CPU 201 determines, based on the type of the sheet used in the job, the value of the voltage to be output by the high voltage power source 55 (voltage applying means) by referencing the information memorized in the memory unit.

In Sb4, the CPU 201 determines whether or not a current sheet S is a last sheet in the image forming job, and if the current sheet S is not the last sheet (Sb4N), then the CPU 201 returns the process to Sb3 and repeats the same process for the following sheet S. If the current sheet S is the last sheet (Sb4Y), then the CPU 201 ends the process.

(Automatic Correction Mode)

In a case of the automatic correction mode, the CPU 201 changes the charge-eliminating voltage based on a detecting result of the current detecting circuit 55*a* when the sheet S passes through the charge-eliminating nip (changing process). In other words, in the automatic correction mode (first mode), the CPU 201 changes the value of the voltage to be output by the high voltage power source 55 (voltage applying means) based on the detecting result of the current detecting circuit 55*a* (current detecting means) when the sheet S passes through the charge-eliminating roller 51*b*. Hereinafter, a specific control mode of the automatic correction mode in the present Embodiment will be described.

First, the CPU 201 acquires the job information (Sc1). In the image forming apparatus 100, the image forming operation is started based on the job information. On the other hand, preparing for the charge-eliminating process in the charge-eliminating apparatus 300, the CPU 201 acquires the set value of the charge-eliminating voltage (Sc2). The set value of the charge-eliminating voltage acquired in Sc2 is, for example, the value input by the user in advance through the operating portion for charge-eliminating 54 (voltage adjusting switch 54*b*). The CPU 201 determines the set value of the charge-eliminating voltage acquired in Sc2 as the value of the charge-eliminating voltage (initial charge-eliminating voltage) to be output by the high voltage power source 55 during a period immediately after the start of the image forming job (Sc3).

Hereinafter, a current value which is detected by the current detecting circuit 55*a* from when a leading end of the sheet S in the sheet conveyance direction Cv enters the charge-eliminating nip to when a trailing end of the sheet S exits the charge-eliminating nip, is referred to as a charge-eliminating current during paper passing for the sheet S. For the first few sheets S in the image forming job, by applying the initial charge-eliminating voltage (predetermined voltage value) to the charge-eliminating roller 51*b*, it is considered that the charge-eliminating current during paper passing becomes a value, with which the charge of the sheet S can be properly eliminated. However, for example, during the execution of the image forming job, in which a very large number of the sheets S are output, due to the resistance fluctuation of the charge-eliminating roller 51*b*, etc. for the reasons described above, there is a possibility that it becomes impossible to properly eliminate the charge of the sheet S. In the present Embodiment, while the ionizer portion 52, which is disposed downstream of the charge-eliminating roller 51*b*, also performs the charge-eliminating, however, an electrification charge amount which the ionizer portion 52 can eliminate is less than that of the charge-eliminating roller 51*b*. Therefore, in a case in which the charge-eliminating roller 51*b* cannot properly eliminate the charge of the sheet S, there is a possibility that the charge of the sheet S is not properly eliminated before the sheet S is discharged from the charge-eliminating apparatus 300.

Therefore, in the present Embodiment, a control, in which measured values of the charge-eliminating current for a first predetermined number of sheets N in the image forming job are memorized as initial charge-eliminating currents, and the value of the charge-eliminating voltage thereafter is corrected based on the initial charge-eliminating currents, is performed.

The number of the sheets S (the predetermined number of sheets N), for which the initial charge-eliminating current are measured, is preferably configured to be two or more in order to reduce an effect of variations in each sheet S. In the present Embodiment, the predetermined number of sheets N is set to three, however, it may be set to a number other than three.

The CPU 201 acquires the charge-eliminating currents during paper passing for each of the sheet S while counting the current sheet S, which is conveyed to the charge-eliminating apparatus 300, is what number of the sheets, with the sheet S, which is conveyed firstly to the charge-eliminating apparatus 300 from the start of the image forming job, as the first sheet (Sc4). Then, if the current sheet S corresponds to the predetermined number of sheets from the start of the job (Sc5Y), then an initial charge-eliminating current I0 is calculated based on the values of the charge-eliminating currents of the sheets S from the first sheet to the predetermined number of sheets (Sc6). In the present Embodiment, a mean value of the values of the charge-eliminating currents of the sheets S from the first sheet to the predetermined number of sheets is defined as the initial charge-eliminating current I0.

The initial charge-eliminating current I0 is a target value (target current value) of the charge-eliminating current (controlled variable, control amount) during the execution of the image forming job. That is, in the present Embodiment, the target value of the charge-eliminating current is determined based on the detecting result of the current detecting circuit 55*a* when the sheet S passes through the charge-eliminating roller 51*b* (charge-eliminating member) in a state in which the high voltage power source 55 is applying the voltage to the charge-eliminating roller 51*b* at the predetermined voltage value after the start of the job.

In addition, following the calculation of the initial charge-eliminating current I0, the CPU 201 calculates a threshold value Ith to determine whether or not the correction of the charge-eliminating voltage is executed (Sc7). The threshold value Ith is an amount (unit: μA) which stipulates a degree of deviation of the charge-eliminating current during paper passing from the initial charge-eliminating current I0 when the correction of the charge-eliminating voltage is executed.

In the present Embodiment, a value of the threshold value Ith is determined by the following method. A set value of the charge-eliminating voltage which is set via the operating portion for charge-eliminating 54 is defined as V0 (kV). The initial charge-eliminating current is defined as I0. A changeable step of the charge-eliminating voltage when a value of the ones place is changed by one in the voltage adjusting switch 54*b* is defined as ΔV (kV). In this case, the threshold value Ith is calculated by the following equation.

$$Ith=|I0/V0\times\Delta V|$$

In other words, the threshold value Ith in the present Embodiment is defined as an absolute value of a value calculated by a value, which is calculated by the initial charge-eliminating current I0 being divided by the set value of the charge-eliminating voltage V0, being multiplied by the changeable step of the charge-eliminating voltage ΔV which corresponds to a minimum adjusting unit of the voltage adjusting switch 54*b*. For example, in a case in which the initial charge-eliminating current I0 is −40 μA, the set value of the initial charge-eliminating voltage V0 is −4.0 kV and the variable step of the charge-eliminating voltage ΔV is −0.1 kV, the threshold value Ith is 1.0 μA.

In a case in which the current sheet S is a sheet after the predetermined number of sheets from the start of the job, the CPU 201 acquires a charge-eliminating current during paper passing I of the current sheet S (Sc 8). Then, the CPU 201 compares an absolute value of a difference between the charge-eliminating current during paper passing I and the initial charge-eliminating current I0 with the threshold value Ith described above (Sc 9). If the absolute value of the difference between I and I0 is more than the threshold value Ith (Sc9Y), then the CPU 201 determines that the value of the charge-eliminating voltage needs to be corrected, and corrects the value of the charge-eliminating voltage so as to make the charge-eliminating current closer to the target value (I0) (Sc10). If the absolute value of the difference between I and I0 is the threshold value Ith or less (Sc9N), then the CPU 201 determines that the value of the charge-eliminating voltage needs not to be corrected and maintains the value of charge-eliminating voltage.

For example, considering a case in which the initial charge-eliminating current I0 is −40 μA, the set value of the initial voltage V0 is −4.0 kV, the changeable step of the charge-eliminating voltage ΔV is −0.1 kV and the threshold value Ith is 1.0 μA. In this case, if the charge-eliminating current during paper passing I of the current sheet S is a value less than −41 μA or a value more than −39 μA, then the correction of the charge-eliminating voltage is executed (Sc10). Assuming a case in which the charge-eliminating current I is −42 μA in a fourth sheet S, the absolute value of the difference from the initial charge-eliminating current I0 is 2 (μA), which is more than the threshold value Ith, and therefore the charge-eliminating voltage is corrected so that the absolute value of the charge-eliminating current becomes smaller. A correcting step of the charge-eliminating voltage is defined as, for example, the changeable step of the charge-eliminating voltage ΔV, which corresponds to the minimum adjusting unit of the voltage adjusting switch 54*b*. That is, the value of charge-eliminating voltage to be applied to the charge-eliminating roller 51*b* by the high voltage power source 55 is corrected from −4.0 kV, which is the set value of the initial voltage V0, to −3.9 kV, which is a lower voltage only by 0.1 kV.

Incidentally, in the present Embodiment, the correcting step of the charge-eliminating voltage is configured to be a fixed value (0.1 kV) regardless of a magnitude of the absolute value of the difference between the detected charge-eliminating current I and the initial charge-eliminating current I0, however, the correcting step may be changed depending on the absolute value of the difference between I and I0.

Thereafter, the CPU 201 determines whether or not the current sheet S is the last sheet in the image forming job, and if the current sheet S is not the last sheet (Sc11N), then the CPU 201 returns the process to Sc8 and repeats the same process for the following sheet S. If the current sheet S is the last sheet (Sc11N), then the CPU 201 ends the process.

(Example of Transition of the Charge-Eliminating Voltage and the Charge-Eliminating Current)

Figure 7:
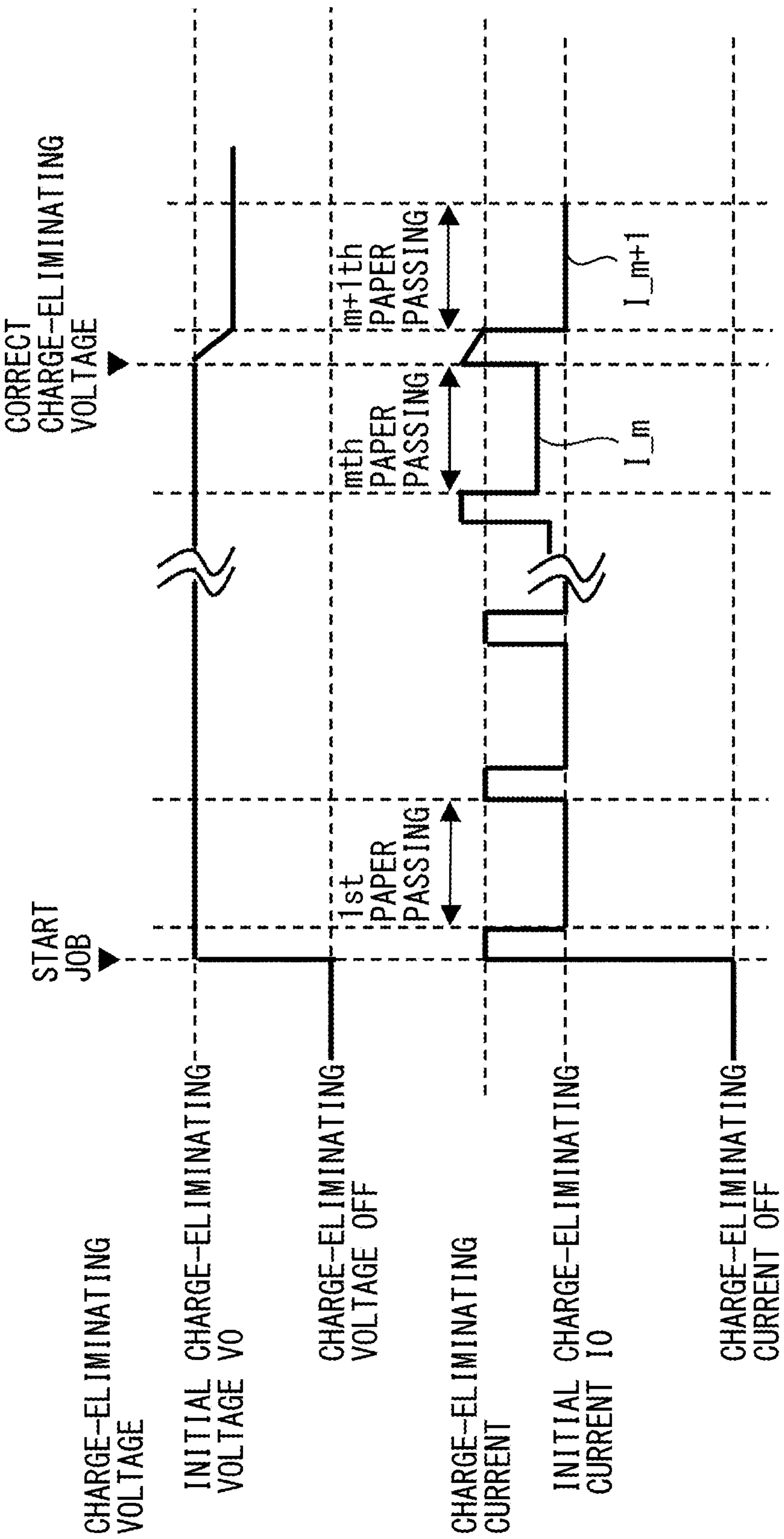
FIG. 7 is a view illustrating an example of transition of a charge-eliminating current and a charge-eliminating voltage in the Embodiment 1.

In FIG. 7, an example of transition of the charge-eliminating voltage and the charge-eliminating current in a case in which the above control is executed is illustrated. For the first few sheets S immediately after the start of the image forming job, the initial charge-eliminating voltage is applied at the set value of the charge-eliminating voltage V0, and the charge-eliminating current during paper passing is the initial charge-eliminating current I0. However, as time passes, the value of the charge-eliminating current deviates from the initial charge-eliminating current I0.

In the example in FIG. 7, for a mth sheet S from the start of the job, an absolute value of the charge-eliminating current during paper passing I_m is greater than the absolute value of the initial charge-eliminating current I0, and the difference therebetween is more than the threshold value Ith. In this case, after the mth sheet S exits the charge-eliminating nip and before the (m+1)th sheet S enters the charge-eliminating nip, the correction of the charge-eliminating voltage (Sc10 in FIG. 6) is executed. The charge-eliminating voltage is corrected so as to make the charge-eliminating current closer to the initial charge-eliminating current I0, that is, in this case, to a lower voltage value than the initial charge-eliminating voltage (V0) so as to make the absolute value of the charge-eliminating current smaller. As a result, the charge-eliminating current I_(m+1) of the (m+1)th sheet S becomes a closer value to the initial charge-eliminating current I0.

In the present Embodiment, the correction of the charge-eliminating voltage is executed based on the comparison between the detecting result of the charge-eliminating current during paper passing and the target value of the charge-eliminating current during paper passing. This is because, by using the charge-eliminating current during paper passing, it becomes possible to uniquely determine the current value for properly eliminating the charge of the charged sheet S. A magnitude of a current flowing through the charge-eliminating nip when the sheet S is not passing through the charge-eliminating nip (during no paper passing) does not take electromotive force caused by the charge of the sheet S into account. Therefore, in particular, in a case in which a sheet S having high resistance such as a plastic film or a synthetic paper is used, it may be difficult to properly correct the charge-eliminating voltage. To the contrary, by executing the feedback control based on the detecting result of the charge-eliminating current during paper passing, it becomes possible to correct the charge-eliminating voltage depending on the resistance value of the charge-eliminating roller 51*b* and the electrification charge amount of the sheet S.

In this manner, in the automatic correction mode, based on the detecting result of the charge-eliminating current when the preceding sheet in the job passes through the charge-eliminating nip, the feedback control, which changes the set value of the charge-eliminating voltage for the following sheet which passes through the charge-eliminating nip after the preceding sheet, is executed. By this, in the continuous print job, it becomes possible to maintain a state in which a magnitude of the charge-eliminating voltage is an appropriate value, and to make the sticking between the sheets less likely to occur.

In addition, by the automatic correction mode, it becomes possible to reduce a workload placed upon a user compared to a case in which the user performs the adjusting work of the charge-eliminating voltage manually.

<Manual Setting of the Charge-Eliminating Voltage>

In the manual setting mode, an example of a method for a user to set the set value of the charge-eliminating voltage manually will be described. In the manual setting mode, the user inputs the set value of the charge-eliminating voltage to the charge-eliminating apparatus 300 by operating the user operating portion 102 or the operating portion for charge-eliminating 54, and the control circuit 200 causes the high voltage power source 55 to output the charge-eliminating voltage based on the input set value.

Adjusting the charge-eliminating voltage manually has the following advantages, for example. Firstly, a fine adjustment corresponding to various types of media is possible. In a case in which the value of the charge-eliminating voltage set in the automatic correction mode is expected to deviate from an appropriate value, such as when a sheet S, which is made of a plurality of material having different properties, such as a label sheet and a laminate sheet, and a sheet S, of which physical properties of a front surface and a back surface are different, are used, the manual setting mode can deal with those cases properly. In addition, due to a content of the image to be formed on the sheet S (for example, in a case in which an extreme image such as a solid coloring on an entire surface of the sheet continues), the value of the charge-eliminating voltage set in the automatic correction mode is expected to deviate from the appropriate value, however, the manual setting mode can deal with such case properly as well.

Secondly, the manual setting mode can deal a situation that target values of output results (intended uses of the products) vary depending on users. A general advantage of performing the charge-eliminating of the sheet S is to prevent the sheets S from sticking to each other and to facilitate handling of the sheets S in a subsequent post-processing process. On the other hand, the charge-eliminating of the sheet S also has an advantage, for example, in a final product after the sheets S are bound to a book, to make it easier to turn pages thereof and to reduce peeling sounds. Depending on the intended use of the sheet S, which is a product, there is a case in which how the charge-eliminating should be performed on the sheet S differs. In such a case, with the manual setting mode, it becomes possible for a user to adjust the charge-eliminating voltage depending on the intended use.

Figure 8:
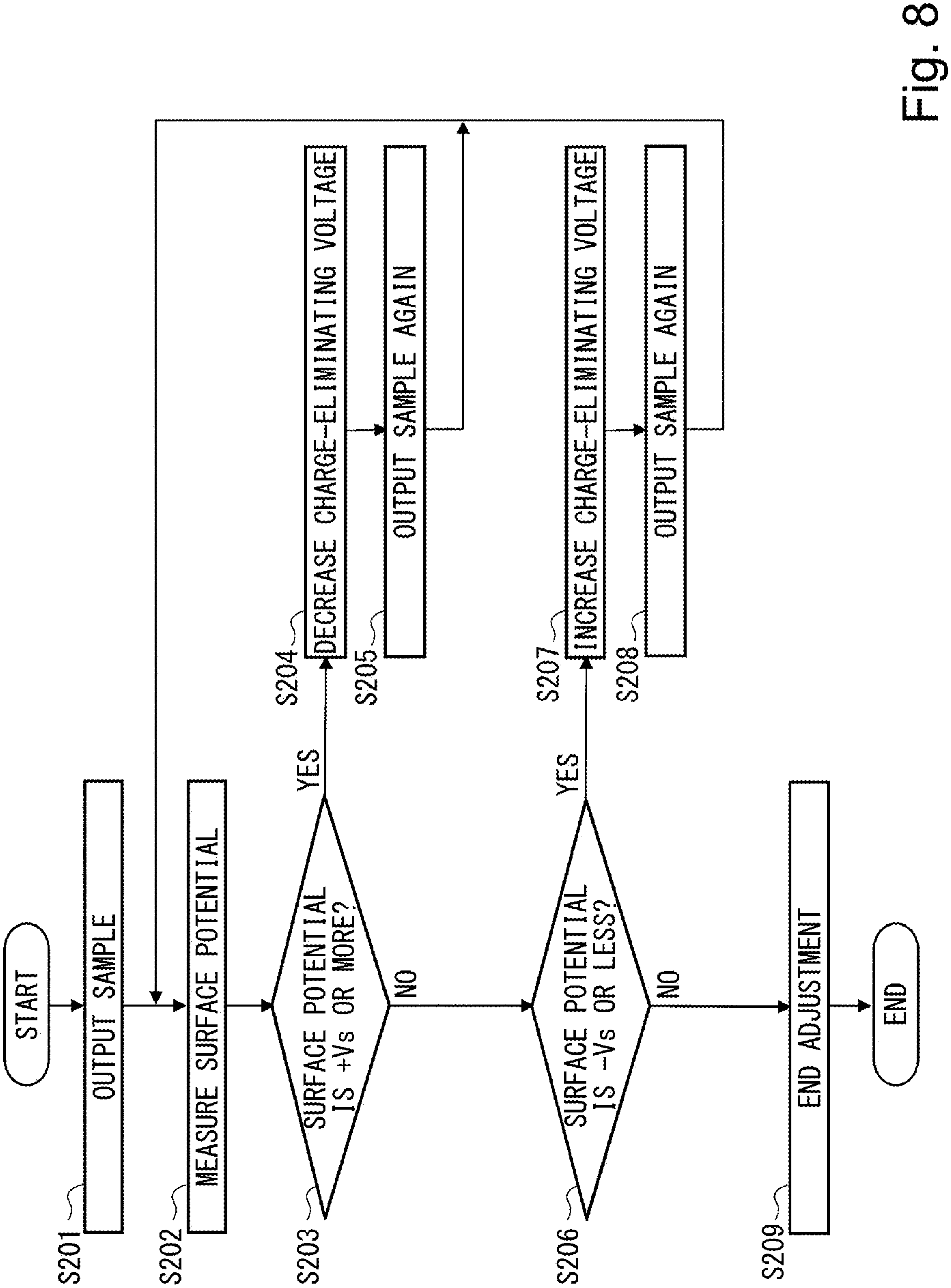
FIG. 8 is a flowchart illustrating a control method (manual adjustment) according to the Embodiment 1.

FIG. 8 is a flowchart illustrating a setting method of the charge-eliminating voltage in the manual setting mode. Incidentally, the present flowchart is only an exemplification, and in practice, a method determined by each user may be performed, and a criterion and a timing to determine a numerical value are not limited to the illustrated in the figure.

First, in S201, a sample output is performed. This may be performed through an instruction for execution of a mode (adjusting mode) which causes the image forming system 400 to output the sheet S for adjustment as a sample, or through extracting a part of the sheets S, which are discharged as products, as the samples during the execution of the normal job. In addition, on a conveyance path of the sheet S in the image forming system 400, a measuring portion, which measures the surface potential of the sheet S, may be provided.

Figure 9:
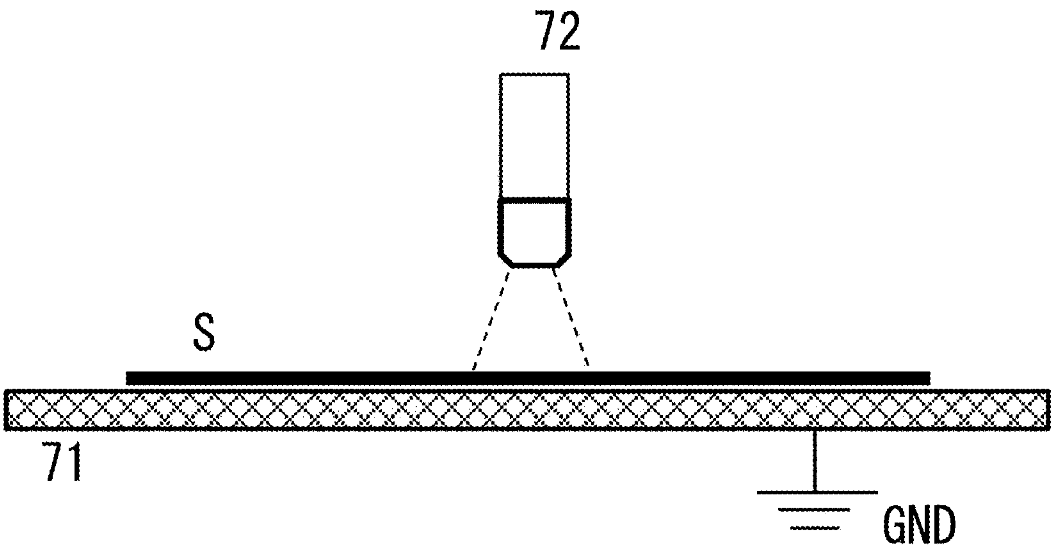
FIG. 9 is an explanatory view on a measurement of surface potential of a sample sheet.

In S202, the surface potential of the sample sheet S is measured. For the measurement of the surface potential, for example, a measuring device (surface potential meter) illustrated in FIG. 9 is used. In this case, the sheet S is placed on a grounding plate 71, which is to be a reference, and by measuring a surface potential of an opposing portion 72, a potential difference between the front and the back of the sheet S is measured.

Here, a threshold value for the potential difference between the front and the back, which satisfies quality of a product, is defined as Vs. In the measuring result in S202, if the potential of the first surface Sa with respect to that of the second surface Sb (FIG. 2) is +Vs or more, then it is determined that the charge-eliminating voltage is excessive (S203Y), and the set value of the charge-eliminating voltage is decreased (S204). That is, by operating the user operating portion 102 or the operating portion for charge-eliminating 54, as the set value of the charge-eliminating voltage, the user enters a value of which an absolute value is smaller than that of the current set value. Then, the sample output is performed again (S205), and returns to S202 to perform the measurement.

Conversely, in the measuring result in S202, if the potential of the first surface Sa with respect to that of the second surface Sb (FIG. 2) is −Vs or less, it is determined that the charge-eliminating voltage is insufficient (S206Y), and the set value of the charge-eliminating voltage is increased (S207). That is, by operating the user operating portion 102 or the operating portion for charge-eliminating 54, as the set value of the charge-eliminating voltage, the user enters a value of which an absolute value is larger than that of the current set value. Then, the sample output is performed again (S208), and returns to S202 to perform the measurement.

In the measuring result in S202, until the potential difference between the front and the back is within a range of Vs, the adjustment as described above is repeated, and if the potential difference between the front and the back is within the range (S203N, S206N), then the adjustment is completed (S209).

<Selection of the Setting Modes of the Charge-Eliminating Voltage>

Using part (a) through part (d) of FIG. 10, a configuration, which allows the user to select the setting modes of the charge-eliminating voltage, will be described. Part (a) through part (d) of FIG. 10 are examples of screens displayed on the display unit 102*a* (FIG. 1) of the user operating portion 102.

Figure 10:
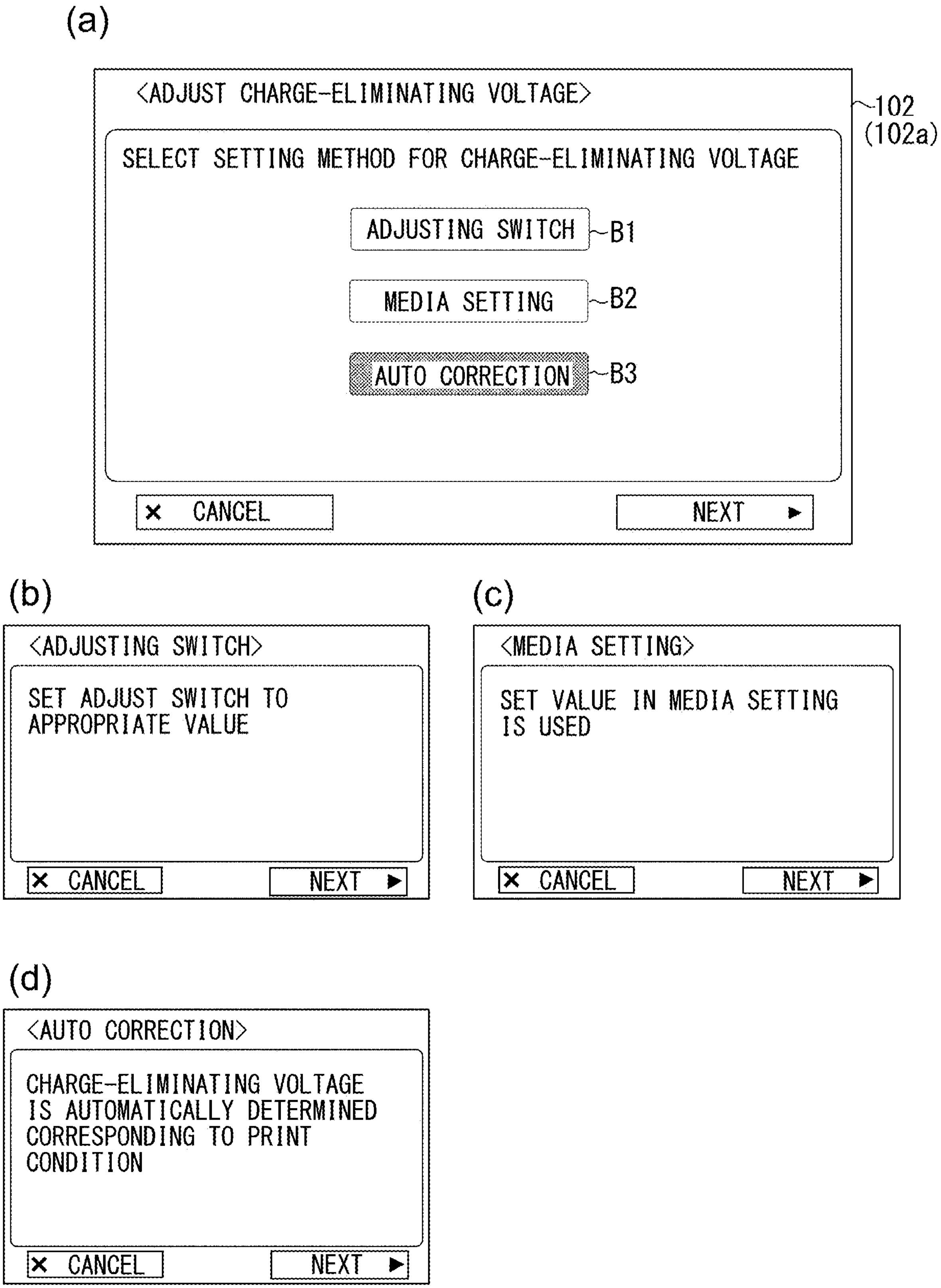
FIG. 10, part (a), part (b), part (c) and part (d), includes views illustrating examples of a screen display of the operating portion according to the Embodiment 1.

A screen of part (a) of FIG. 10 is displayed, for example, by opening a setting screen (user mode), in which a function of the image forming system 400 is set, from a state in which a home screen is displayed on the display unit 102*a*, and further selecting an item related to the adjustment of the charge-eliminating voltage. In the present Embodiment, by pressing either of buttons B1 through B3 displayed in the screen in part (a) of FIG. 10, the user can selectively set the setting method of the charge-eliminating voltage from the automatic correction mode, the manual setting mode or the media setting mode. Upon pressing the button B1 of "adjusting switch", the manual setting mode is selected. Upon pressing the button B2 of "media setting", the media setting mode is selected. Upon pressing the button B3 of "automatic correction", the automatic correction mode is selected.

In this manner, the display unit 102*a*, which displays the screen allowing the user to select the setting method of the charge-eliminating voltage, is an example of a selecting means for the user to select the mode, which the control circuit 200 (control means) executes, from the plurality of the modes.

In a case in which the manual setting mode is selected (part (b) of FIG. 10), as the set value of the charge-eliminating voltage, for example, the value of the charge-eliminating voltage, which is adjusted according to the aforementioned flowchart (FIG. 8) (Sa1 through Sa3 in FIG. 6), is used. In the flowchart in FIG. 8, the charge-eliminating voltage is adjusted based on the potential difference between the front and back of the sheet S measured by the surface potential meter, however, for example, the user may check a degree of the sticking between the sheets S by touching with his or her hand and adjust the value of the charge-eliminating voltage gradually so that sticking force becomes smaller.

One advantage of the manual setting mode is that the user can easily keep track of the set value of the charge-eliminating voltage. In a case in which the environment in which the image forming system 400 is installed and an environment condition for the job execution are stable and the content of the job is routine, by fixing the set value of the charge-eliminating voltage, it becomes possible to reduce an occurrence of a problem caused by the charge-eliminating voltage deviating from the appropriate value unintentionally.

Incidentally, in the manual setting mode, the set value of the charge-eliminating voltage may be changed dynamically (i.e., during the execution of the job). For example, during the execution of the continuous print job, the sheet S may be pulled out as a sample and measured by the surface potential meter, and the set value of the charge-eliminating voltage may be changed or the output/stop outputting of the charge-eliminating voltage may be switched based on the measuring result. In addition, in accordance with a timing when the operating mode of the image forming system 400 is switched during the job, the changing of the set value of the charge-eliminating voltage, etc. may be performed.

Figure 6:
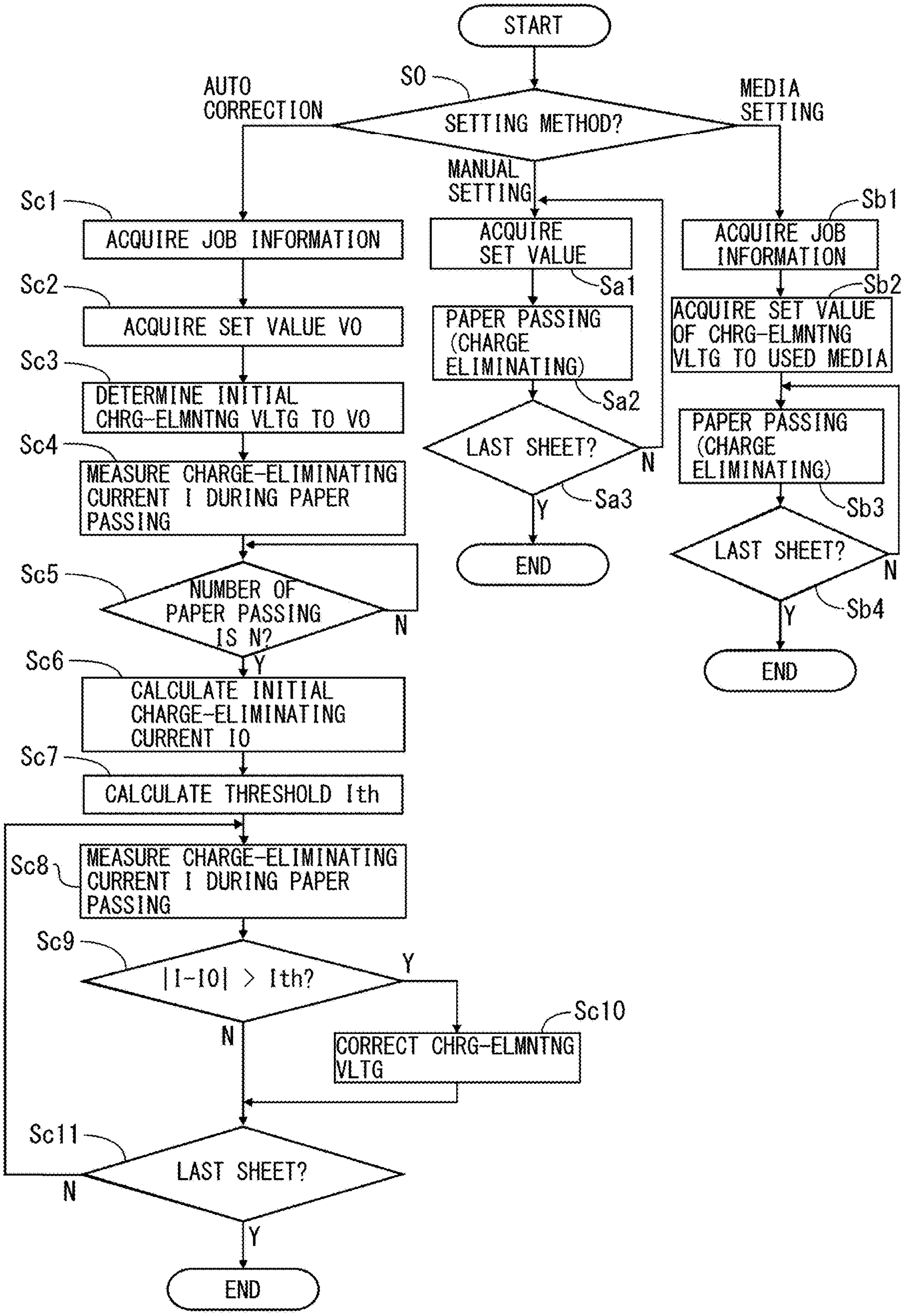
FIG. 6 is a flowchart illustrating a control method (automatic adjustment) according to the Embodiment 1.

In a case in which the media setting mode is selected (part (c) of FIG. 10), in a setting screen in which the settings for each type of the sheet are performed, it becomes possible for the user to enter the set value of the charge-eliminating voltage as well as a basis weight and a surface property of the sheet S, and the entered values are reflected upon the execution of the job (Sb1 through Sb4 in FIG. 6). In this case, for example, for each type of the sheet, by calculating and setting an appropriate value of the charge-eliminating voltage in advance according to the flowchart in FIG. 9, an appropriate charge-eliminating can be performed even in a case in which the same type of the sheet S is used over a plurality of days.

In a case in which the automatic correction mode is selected (part (d) of FIG. 10), as described above, by the feedback control based on the detecting result of the charge-eliminating current during paper passing, the set value of the charge-eliminating voltage is automatically determined (Sc1 through Sc11 in FIG. 6). This mode has the advantage that it is possible to reduce burden on the user upon adjusting the charge-eliminating voltage. In addition, without outputting the sheet S for the sample besides the sheet S for the product, it becomes possible to correct the charge-eliminating voltage automatically in response to fluctuation in the environment condition, etc. Therefore, there is a case in which the automatic correction mode is suitable, for example, when the same type of synthetic sheet (sheet having high resistance) is used and the continuous print job is executed over a long period of time.

Modified Examples

In the present Embodiment, as the setting method of the charge-eliminating voltage, the configuration in which three modes of the automatic correction mode, the manual setting mode and the media setting mode are selectable is exemplified. Not limited thereto, however, the charge-eliminating apparatus 300 and the image forming system 400 may have a configuration in which, as the setting method of the charge-eliminating voltage, only two modes of the above three modes are selectable. For example, the charge-eliminating apparatus 300 and the image forming system 400 may have a configuration in which, as the setting method of the charge-eliminating voltage, either one of the automatic correction mode or the manual setting mode is selected. In addition, the charge-eliminating apparatus 300 and the image forming system 400 may have a configuration in which, as the setting method of the charge-eliminating voltage, from one or more of the above three modes and a mode other than the above three modes, one mode is selectable.

In addition, in the present Embodiment, only in the case in which the button B3 of "automatic correction" is selected on the screen in part (a) of FIG. 10, the function in which the charge-eliminating apparatus 300 corrects the charge-eliminating voltage automatically during the job (automatic correcting function of the charge-eliminating voltage) is enabled. In the cases in which other buttons B1 and B2 are selected on the screen in part (a) of FIG. 10, the automatic correcting function of the charge-eliminating voltage is disabled. In other words, through the operation of selecting the mode of the setting method of the charge-eliminating voltage, enabling/disabling of the automatic correcting function of the charge-eliminating voltage is performed. Not limited thereto, however, for example, on the display unit 102*a* of the user operating portion 102, a screen including a form (check box, button, etc.), through which enabling/disabling of the automatic correcting function of the charge-eliminating voltage is switchable, may be displayed. In this case, for example, when a check is entered in the check box, the automatic correction mode is set, and when the check box is unchecked, the manual setting mode or the media setting mode is set according to a selection by the user. In addition, a state, in which the check is entered in the checkbox (a state in which the automatic correcting function is enabled), corresponds to a state in which the first mode is selected, and a state, in which the check is unchecked (a state in which the automatic correcting function is disabled), corresponds to a state in which the second mode is selected.

The user operating portion 102, which is configured to allow the user to select the mode of the setting method of the charge-eliminating voltage via the screen display, is an example of the selecting means, and the selecting means is not limited thereto. For example, it may be configured that, through an operation to the external computer communicably connected to the image forming system 400, the mode of the setting method of the charge-eliminating voltage can be changed. In this case, the control circuit 200, which is configured to receive an instruction related to the mode selection from the external computer, functions as the selecting means.

In addition, in the automatic correction mode, the set value of the charge-eliminating voltage obtained at the start of a job (Sc2 in FIG. 6) may be automatically obtained, by passing the sheet S for a test, which is different from the sheet S to be a product, and based on the detecting result of a current or a voltage when the sheet S for the test passes through the charge-eliminating nip. For example, after a test image is formed on the sheet S for the test through a similar operation to the normal image forming operation, in a state in which the voltage application to the charge-eliminating roller 51*b* is controlled by constant current control, a change in the applied voltage to the charge-eliminating roller 51*b* when the sheet S for the test passes through the charge-eliminating nip is measured. Since the charge on the surface of the sheet S acts as the electromotive force in the charge-eliminating nip, the electrification charge amount of the sheet S can be observed as the change in the applied voltage. And, based on relationship between a changed amount of the applied voltage and the electrification charge amount and relationship between the electrification charge amount and the appropriate value of the charge-eliminating voltage, which are determined in advance and stored in the ROM 220, the set value of the charge-eliminating voltage is determined.

Embodiment 2

Hereinafter, an Embodiment 2 will be described. A charge-eliminating apparatus 300 in the present Embodiment is provided with a function which automatically corrects the charge-eliminating voltage in a control mode different from the automatic correction mode in the Embodiment 1. Hereinafter, elements with common reference numerals with the Embodiment 1 are considered to be provided with basically the same configurations and actions as those described in the Embodiment 1 unless otherwise described, and portions which differ from the Embodiment 1 will be mainly described.

As described below, in the present Embodiment, as a mode to perform an automatic correction of the charge-eliminating voltage, three modes of a current detecting mode, a number of passed sheets mode and an environment condition mode are selectable. All of the current detecting mode, the number of passed sheets mode and the environment condition mode are examples of the first mode, which automatically changes the value of the voltage to be output by the high voltage power source 55 (voltage applying means) during the execution of the job.

As described above, in the present Embodiment, as the first mode, three control modes of the current detecting mode, the number of passed sheets mode and the environment condition mode are provided. Not limited thereto, however, the control circuit 200 may be configured to be capable of executing one of a plurality of the control modes, which includes at least one of the current detecting mode, the number of passed sheets mode and the environment condition mode.

The charge-eliminating apparatus 300 in the present Embodiment is capable of performing, in addition to the manual setting mode and the media setting mode in the Embodiment 1, the current detecting mode, the number of passed sheets mode and the environment condition mode. However, the charge-eliminating apparatus 300 may be configured to be capable of executing only the current detecting mode, the number of passed sheets mode and the environment condition mode (or even only a part thereof).

<Correction of the Charge-Eliminating Voltage Corresponding to the Number of Passed Sheets>

In the present Embodiment, the resistance value of the charge-eliminating roller 51*b* fluctuates according to the number of passed sheets S from a started time of the job (number of continuously passed sheets). This is mainly due to a fact that, by the charge-eliminating roller 51*b* contacting the sheet S, which is heated by the fixing device 40, a temperature of the charge-eliminating roller 51*b*, which is a normal temperature before the start of the job, gradually rises during the job. As the temperature of the charge-eliminating roller 51*b* rises, the resistance value of the charge-eliminating roller 51*b* becomes lower, and the current flowing therethrough tends to be increased upon the same charge-eliminating voltage being applied.

For this reason, the control circuit 200 (FIG. 5) in the present Embodiment is configured to be selectable of a mode (number of passed sheets mode), in which control gradually decreasing the set value of the charge-eliminating voltage according to the number of continuously passed sheets during the job is performed. In other words, in the number of passed sheets mode as an example of the first mode, the control circuit 200 (control means) changes the value of the voltage to be output by the high voltage power source 55 (voltage applying means) based on the number of sheets conveyed during the execution of the job.

Figure 12:
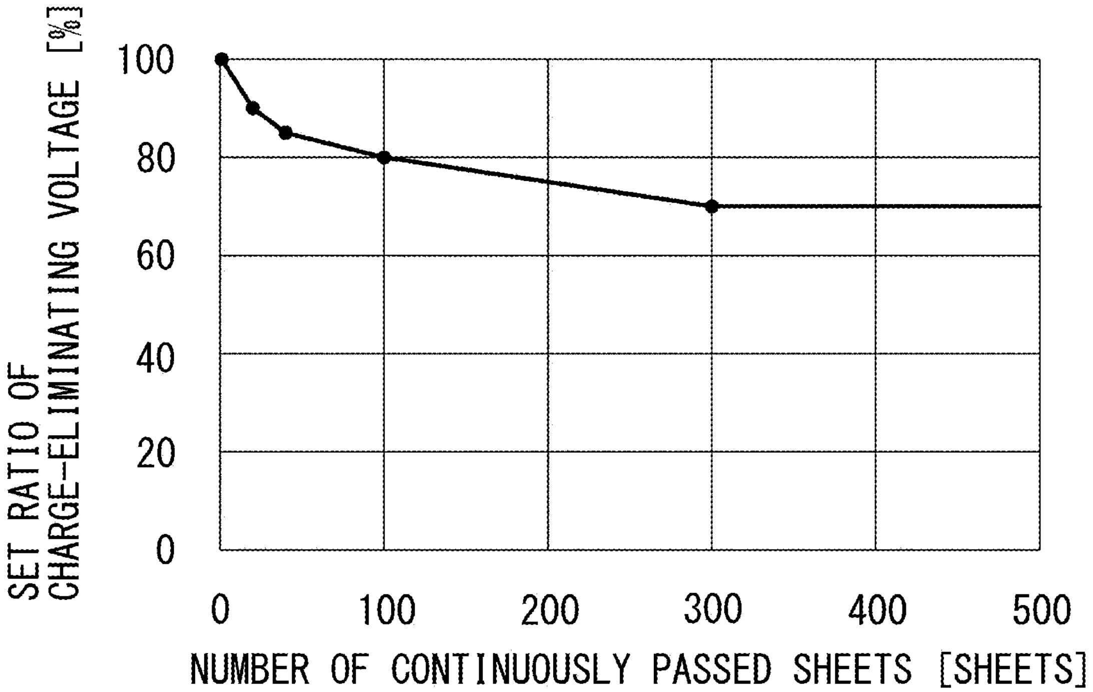
FIG. 12 is an explanatory view of control corresponding to a number of continuously passed sheets in the Embodiment 2.

FIG. 12 is a graph illustrating an example of relationship between the number of continuously passed sheets and set ratio of the charge-eliminating voltage. The set ratio of the charge-eliminating voltage is what represents a value of the charge-eliminating voltage suitable for performing the charge-eliminating of the sheet S (the appropriate value of the charge-eliminating voltage) with the appropriate value of the charge-eliminating voltage at the start of the job as a reference (100%). Here, it is assumed that data (table or a parameter for a converting equation) corresponding to FIG. 12 are stored in the ROM 220 of the control circuit 200 in advance. In addition, since this relationship may vary depending on the type of the sheet S, it is preferable that a plural sets of data for each type of the sheet (or for each category in which the sheet types are classified) be prepared. Regardless of the physical properties of the sheet S, however, normally, the set ratio of the charge-eliminating voltage decreases gradually depending on the number of continuously passed sheets.

For example, in the case in which the relationship between the number of continuously passed sheets and the set ratio of the charge-eliminating voltage is as shown in FIG. 12, when the number of continuously passed sheets reaches 100 sheets, the set value of the charge-eliminating voltage is changed to 80% of the initial charge-eliminating voltage. For example, in a case in which a continuous print job is started in a state in which the charge-eliminating voltage is set to 4.0 kV through the operating portion for charge-eliminating 54 and a paper passing history mode (a button B5 in FIG. 13), which will be described below, is selected, the charge-eliminating voltage of 3.2 kV is applied to the 100th and subsequent sheets S.

As a period in which the image forming system 400 does not perform a job (a period in which no sheet S is conveyed to the charge-eliminating apparatus 300, a standby period) becomes longer, the temperature of the charge-eliminating roller 51*b* gradually approaches to the normal temperature. Therefore, after a previous job is completed, the value of the charge-eliminating voltage at a start of the next job is set to a value close to the set ratio of 100% depending on a length of the standby period. In other words, in a case in which the next job is started immediately after the completion of the previous job, the value of the charge-eliminating voltage at the start of the next job is applied based on the set ratio according to the number of continuously passed sheets of the previous job. On the other hand, in a case in which the next job is started after a sufficient time has elapsed from the completion of the previous job, for the value of the charge-eliminating voltage at the start of the next job, regardless of the number of continuously passed sheets of the previous job, for example, the value of the initial charge-eliminating voltage, which is set through the operating portion for charge-eliminating 54 (the value of the set ratio of 100%), is applied.

<Correction of the Charge-Eliminating Voltage Corresponding to the Environment Condition>

In addition, even in a case in which the type of the sheet S is the same, the appropriate value of the charge-eliminating voltage may fluctuate by the resistance value of the sheet S changing depending on the environment condition (especially, the environmental moisture amount) of the environment in which the charge-eliminating apparatus 300 is installed.

In the present Embodiment, in the case in which the automatic correction function is enabled, the environment condition mode (a button B4 in FIG. 13), in which the set value of the charge-eliminating voltage is automatically determined based on the environment condition, can be selected. In other words, in the environment condition mode as an example of the first mode, the control circuit 200 (control means) changes the value of the voltage to be output by the high voltage power source 55 (voltage applying unit (means)) based on the detecting result of the environment sensor 13 (environment detecting means).

In the environment condition mode in the present Embodiment, simply, as the set value of the charge-eliminating voltage, a value, which corresponds to the environmental moisture amount and is set in advance, is applied, and the control according to the paper passing history or the detecting result of the charge-eliminating current during the job is not performed.

Figure 11:
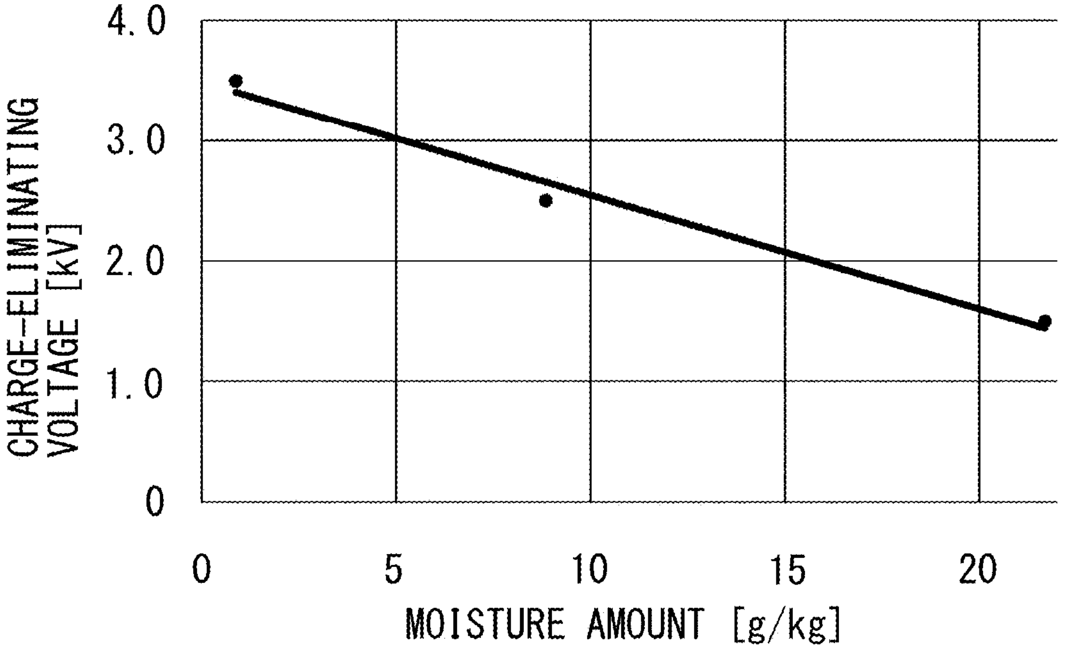
FIG. 11 is an explanatory view of control corresponding to an environmental moisture amount in an Embodiment 2.

FIG. 11 is a graph illustrating relationship of the set value of the charge-eliminating voltage to the environmental moisture amount (weight absolute humidity, unit: g/kg). Here, it is assumed that data (table or a parameter for a converting equation) corresponding to FIG. 11 are stored in the ROM 220 of the control circuit 200 in advance. In a case in which the job is executed under the environment condition mode, based on the environment information detected by the environment sensor 13, by referencing the data in the ROM 220, the control circuit 200 determines the set value of the charge-eliminating voltage. When the environmental information is changed during the job, at any time, the set value of the charge-eliminating voltage is changed based on the detected environment information.

In this manner, by automatically correcting the set value of the charge-eliminating voltage based on the detecting result of the environment sensor 13, the charge-eliminating of the sheet S can be performed at the appropriate charge-eliminating voltage corresponding to the environment condition.

<Selection of the Setting Method of the Charge-Eliminating Voltage>

Figure 13:
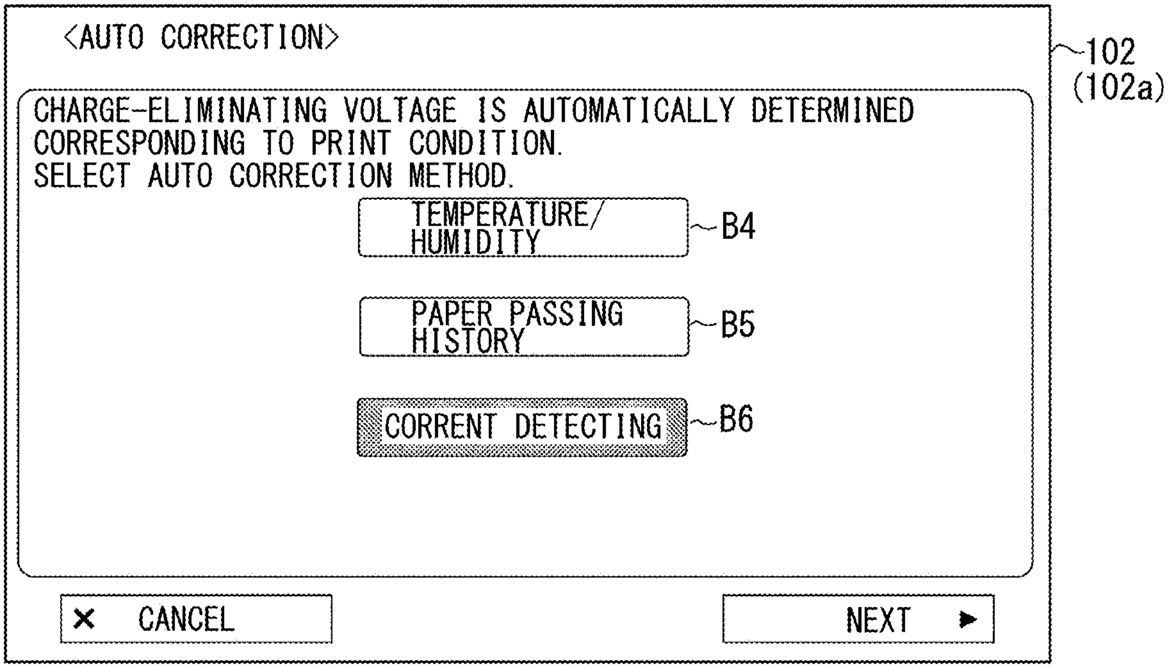
FIG. 13 is a view illustrating an example of a screen display of the operating portion according to the Embodiment 2.

In the present Embodiment, the user can select the setting method of the charge-eliminating voltage from the three modes described above. FIG. 13 is an example of a selection screen in which the setting method of the charge-eliminating voltage is selected. Through an operation of the screen in FIG. 13 displayed on the display unit 102*a* (FIG. 1) of the user operating portion 102, the user can select either of the three modes of the environment condition mode, the number of passed sheets mode or the current detecting mode.

The selection screen in FIG. 13 is displayed, for example, when the "automatic correction" button B3 is selected on the setting screen of the setting method of the charge-eliminating voltage (part (a) of FIG. 10) described in the Embodiment 1. Incidentally, in a case in which the charge-eliminating apparatus 300 is configured not to include the functions of the manual setting mode and the media setting mode, the screen in FIG. 13 may be displayed instead of the setting screen in part (a) of FIG. 10.

If an "environmental temperature and humidity" button B4 is pressed, then the aforementioned environment condition mode, in which the value of the charge-eliminating voltage corresponding to the environment condition is applied, is selected. For example, after the continuous print job is started on the image forming system 400 in an early morning (in a state in which the apparatus is cooled), even in a case in which the temperature and the humidity gradually rise during the job, at any time, the charge-eliminating voltage corresponding to the environmental moisture amount is applied. By this, it becomes possible to reduce a possibility that the charge-eliminating voltage becomes excessive or insufficient due to the change in the environment condition during the job.

If the "paper passing history" button B5 is pressed, then the aforementioned number of passed sheets mode, which corrects the charge-eliminating voltage corresponding to the number of continuously passed sheets during the job, is selected. For example, when a large number of the sheets S are intermittently passed in bundles of several tens of the sheets, change in the appropriate value of the charge-eliminating voltage during the several tens of the sheets constituting a single bundle are continuously passing can be regarded as a certain pattern (a pattern as shown in FIG. 12). In such cases, there is a case in which the number of passed sheets mode is appropriate. On the other hand, in the following current detecting mode, errors may occur in initial few sheets S before the correction of the charge-eliminating voltage is started and/or in a latter half of the continuous paper passing.

If a "current detection" button B6 is pressed, the current detecting mode, in which the charge-eliminating voltage is automatically corrected based on the detecting result of the charge-eliminating current during the job, is selected. The contents of the control in the current detecting mode are the same as in the automatic correction mode in the Embodiment 1 (Sc1 through Sc11 in FIG. 6). For example, in a continuous print job using the same type of synthetic sheet, with the current detecting mode, there is a case in which it becomes possible to deal more appropriately with the change in the resistance of the charge-eliminating roller 51*b* during the job and/or the change in a resistance of the synthetic paper due to the environment condition.

In this manner, in the present Embodiment, it is configured that the modes of the automatic correction of the charge-eliminating voltage are selectable by the user. By this, it becomes possible for the user to select the mode which he or she considers most appropriate according to a specific use condition, thereby improving usability and reducing the sticking between the sheets by the charge-eliminating being performed at the charge-eliminating voltage of a more appropriate magnitude. And it becomes possible to reduce man-hours for manual handling (separating work with hands) for eliminating the sticking between the sheets and improve handling quality in a post-processing process, thereby making it easier to deal with a variety of sheet material including a synthetic sheet, a film sheet and a label sheet.

Embodiment 3

In the Embodiments 1 and 2, it is determined by the selection of the user whether or not the automatic correcting function for the charge-eliminating voltage is enabled and, in the case in which the automatic correction is executed, which of the plurality of the modes is selected (hereinafter collectively referred to as a mode selection of the charge-eliminating voltage). The mode selection of the charge-eliminating voltage may be automatically (i.e., regardless of the selection of the user) performed based on the type of the sheet S or other conditions.

In the present Embodiment, it is assumed that information related to the physical properties of the sheet S (media information) is input for each type of the sheet via the user operating portion 102 in advance and stored in the memory unit such as the ROM 220 or the RAM 210. The media information is configured to include information representing a volume resistivity of the sheet S or information related to the volume resistivity of the sheet S (material, thickness thereof, etc.) at least.

Not limited to the method of inputting media information via the user operating portion 102, it may be configured that a media sensor capable of automatically determining the physical properties of the sheet S is provided to the charge-eliminating apparatus 300 or the image forming system 400, and the media information is acquired based on a detecting result of the media sensor. The media sensor may be, for example, what of ultrasonic type which determines the thickness (basis weight) of the sheet S using ultrasonic waves, what of optical type which determines a surface property of the sheet S by irradiating light and based on a reflected light amount, or a combination of the ultrasonic type and the optical type.

The control circuit 200 obtains the media information, which corresponds to the type of the sheet S to be used for the current job. Corresponding to the media information, the condition data representing the setting whether or not the automatic correcting function of the charge-eliminating voltage is enabled and, in the case in which the automatic correction is executed, which of the plurality of the modes is selected is stored, for example, in the ROM 220 in advance. The control circuit 200 refers to the condition data, executes the mode selection of the charge-eliminating voltage, and applies either of the setting methods of the charge-eliminating voltage described in the Embodiments 1 and 2.

The mode selection of the charge-eliminating voltage corresponding to the type of the sheet S is performed, for example, based on a thickness of a high resistance layer of the sheet S. If the sheet S has the high resistance layer of 100 μm or more, then the automatic correction mode in the Embodiment 1 is selected. If the sheet S has the high resistance layer of less than 100 μm or the sheet S does not have the high resistance layer, then the media setting mode or the manual setting mode is selected. The high resistance layer referred here is a layer made of material having a volume resistivity of $1\times10^{12}$ [Ω cm] or more and, for example, a surface treatment layer (coated layer) of PI (polyimide) falls therein. For example, the sheet S with a pulp layer of 120 μm coated with a PI layer of 30 μm has the high resistance layer of less than 100 μm, therefore the media setting mode or the manual setting mode is selected and the fixed value of the charge-eliminating voltage set in advance is applied. In this manner, the control circuit 200 in the present Embodiment functions as the selecting means, which selects either of the plurality of the modes based on the type of the sheet to be used in the job.

Modified Examples

In the Embodiment 3, the example in which the mode selection of the charge-eliminating voltage is automatically performed based on the type of the sheet S (especially the thickness of the high resistance layer) is described, however, the mode selection of the charge-eliminating voltage may be automatically executed based on other conditions.

As an example, the mode selection of the charge-eliminating voltage may be automatically executed based on the environment condition (environmental moisture amount) detected by the environment sensor 13 (FIG. 5). For example, it may be configured that, in an environment of low humidity, since the relatively high charge-eliminating voltage is required and the appropriate value of the charge-eliminating voltage is likely to fluctuate by a slight change in the moisture amount, the automatic correction mode is selected, and conversely, in an environment of high humidity, the media setting mode or the manual setting mode is selected. In this case, the control circuit 200 functions as the selecting means to select either of the plurality of the modes based on the detecting result of the environment sensor 13 (environment detecting means).

As another example, it may be configured that the mode selection of the charge-eliminating voltage is automatically executed based on the measured value of the current flowing through the charge-eliminating roller 51*b* or the secondary transfer roller 9. For example, if the measured current value of the charge-eliminating roller 51*b* is a certain value or less, then, since error in the automatic correction mode may become large, the application of the automatic correction mode may be stopped. In this case, the control circuit 200 functions as the selecting means to select either of the plurality of the modes based on the detecting result of the current detecting circuit 55*a* (current detecting means) which detects the current flowing through the charge-eliminating roller 51*b* (charge-eliminating member).

As yet another example, in the case in which the automatic correcting function of the charge-eliminating voltage is disabled (the second mode), in a case in which a difference between the current set value of the charge-eliminating voltage and the appropriate value of the charge-eliminating voltage which is calculated based on the detecting result of the charge-eliminating current during paper passing, etc. exceeds a predetermined permissible range, a notification may be performed. The notification means, in order to perform the charge-eliminating of the sheet S properly, to notify the user of information prompting the user to reset the charge-eliminating voltage via the operating portion for charge-eliminating 54 or the user operating portion 102. For a method of the notification, a screen display on or sound from the user operating portion 102 may be used, or a screen display on or sound from the external computer connected to the image forming system 400 may be used. In the present Modified Examples, in a case in which a user is accurately aware of states of the products, for example, it is advantageous that it becomes possible to eliminate the charged state of the product while reducing load onto the user.

Other Embodiments

In each of the Embodiments described above, the charge-eliminating apparatus 300, which performs the charge-eliminating of the sheet S, is described, however, the charge-eliminating apparatus 300 has a function as a charge adjusting apparatus, which adjusts the charged state of the sheet S by supplying an electric charge to the sheet S via the charge-eliminating roller 51*b* as a charge applying member. Such the charge adjusting apparatus performs, in the image forming job in which the image formations are performed onto a plurality of the sheets, a charge applying operation in which the electric charge is continuously applied to the plurality of the sheets. The charge adjusting apparatus may be what does not necessarily reduce (not eliminate) the electrification charge amount of the sheet S. For example, in a state in which the sheets S are stacked after processing by the charge adjusting apparatus, the charge adjusting apparatus may be what adjusts the electrification charge amount of each surface of the sheet S so that the surfaces of overlapping sheets, which are opposing to each other, are in a state being charged to the same polarity. Specifically, the charge adjusting apparatus applies voltage to every other sheet of a plurality of the sheets so that the electrostatic polarities of the sheet surfaces are reversed. In this case, by the surfaces of the overlapping sheets, which are opposing to each other, being charged to the same polarity, it becomes possible to reduce sticking between the sheets due to electrostatic force. In addition, by applying the control described in each Embodiment to control of the voltage to be applied to the charge-eliminating roller 51*b* as the charge applying member, it becomes possible to adjust the charged state of the sheet S more properly.

In addition, in each of the Embodiments described above, as an example of the charge-eliminating member of contact type, which contacts the sheet S, the charge-eliminating roller 51*b*, which is a roller member, is described. However, the charge-eliminating member of contact type is not limited thereto, but may be, for example, a brush member of which electroconductive fibers or an elongated electroconductive sheet pieces contact the sheet S.

In addition, in each of the Embodiments described above, it is described as the charge of the sheet S is mainly occurred in the transfer portion of the electrophotographic process. Not limited thereto, however, in an image forming system other than the electrophotographic type, such as an inkjet type, the charge of the sheet S may be occurred by triboelectric charging or peeling charging due to rubbing against and/or peeling off of a conveyance guide, a conveyance roller and/or a conveyance belt, etc. Therefore, the present technique may be applied to an image forming system of a type other than the electrophotographic type.

Other Embodiments

The present invention may also be realized by a process in which a program realizing one or more functions of the Embodiments described above are supplied to the system or the apparatus via a network or a storage medium, and one or more processors in a computer of the system or the apparatus read out and execute the program. In addition, the present invention may also be realized by a circuit which realizes one or more functions (e.g., ASIC).

According to the present invention, it becomes possible to provide the charge-eliminating apparatus, the image forming system and the charge adjusting apparatus capable of applying the voltage to the charge-eliminating member in the appropriate type.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-014965 filed on Feb. 2, 2024, which is hereby incorporated by reference herein in its entirety.

What is claimed is:

1. An image forming system comprising:

an image forming portion configured to form an image on a sheet;

a charge applying member configured to apply charge to a sheet in contact with the sheet;

a voltage applying unit configured to apply a voltage to the charge applying member;

an inputting unit configured to allow a user to input voltage information of the voltage applied to the charge applying member by the voltage applying unit;

a controller capable of executing a changing process in which a voltage to be output by the voltage applying unit in a charge adjusting operation in which a charge state of the sheet on which the image is formed in an image forming job is adjusted is changed from the voltage according to the voltage information input by the inputting unit; and a selecting unit configured to select a first mode in which the changing process is performed or a second mode in which the changing process is not performed, wherein, in the second mode, the controller causes the voltage applying unit to output the voltage by the value input through the inputting unit before a start of the image forming job regardless of a type of the sheet.

2. The image forming system according to claim 1, wherein the selecting unit is a display unit configured to display a screen for a user to select either the first mode or the second mode.

3. The image forming system according to claim 1, wherein the selecting unit selects either the first mode or the second mode based on a type of the sheet.

4. The image forming system according to claim 1, further comprising an environment detecting unit configured to detect an environmental condition, wherein the selecting unit selects either the first mode or the second mode based on a detecting result of the environment detecting unit.

5. The image forming system according to claim 1, further comprising a detecting unit configured to detect a voltage applied to the charge applying member or a current flowing through the charge applying member, wherein the selecting unit selects either the first mode or the second mode based on a detecting result of the detecting unit.

6. The image forming system according to claim 1, further comprising a current detecting unit configured to detect a current flowing through the charge applying member, wherein in the changing process, the controller changes the voltage to be output by the voltage applying unit based on a detecting result of the current detecting unit when the sheet passes through the charge applying member.

7. The image forming system according to claim 1, further comprising an environment detecting unit configured to detect an environment condition, wherein in the changing process, the controller changes the value of the voltage to be output by the voltage applying unit based on a detecting result of the environment detecting unit during the execution of the charge adjusting operation.

8. The image forming system according to claim 1, wherein in the changing process, the controller changes the value of the voltage to be output by the voltage applying unit based on a number of sheets conveyed during the execution of the charge adjusting operation.

9. The image forming system according to claim 1, wherein in the second mode, in a case in which the inputting unit is operated after the start of the charge adjusting operation, the controller changes the value of the voltage to be output by the voltage applying unit from the value input through the inputting unit before the start of the charge adjusting operation to the value input through the inputting unit after the start of the charge adjusting operation.

10. An image forming system comprising:

an image forming portion configured to form an image on a sheet;

a charge applying member configured to apply charge to a sheet in contact with the sheet;

a voltage applying unit configured to apply a voltage to the charge applying member;

an inputting unit configured to allow a user to input voltage information of the voltage applied to the charge applying member by the voltage applying unit;

a controller capable of executing a changing process in which a voltage to be output by the voltage applying unit in a charge adjusting operation in which a charge state of the sheet on which the image is formed in an image forming job is adjusted is changed from the voltage according to the voltage information input by the inputting unit;

a selecting unit configured to select a first mode in which the changing process is performed or a second mode in which the changing process is not performed; and a memory unit configured to memorize a value of a voltage set in advance through the inputting unit for each type of the sheet, wherein in the second mode, the controller causes the voltage applying unit to output the voltage by the voltage applying unit by referencing information memorized in the memory unit based on the type of the sheet.

11. The image forming system according to claim 1, wherein in the second mode, the controller provides information prompting a user to reset the voltage to be applied to the charge applying member in a case in which a difference between the value of the voltage output by the voltage applying unit during the execution of the charge adjusting operation and a value calculated by the controller as a suitable voltage value for applying to the charge applying member during the execution of the charge adjusting operation exceeds a predetermined permissible range.

12. A charge adjusting apparatus comprising:

a charge applying member configured to apply charge to a sheet in contact with the sheet;

a voltage applying unit configured to apply a voltage to the charge applying member;

an inputting unit configured for a user to input voltage information of the voltage applied to the charge applying member by the voltage applying unit;

a controller capable of executing a changing process in which a voltage to be output by the voltage applying unit in a charge adjusting operation in which a charge state of the sheet on which the image is formed in an image forming job is adjusted is changed from the voltage according to the voltage information input by the inputting unit; and a selecting unit configured to select a first mode in which the changing process is performed or a second mode in which the changing process is not performed, wherein, in the second mode, the controller causes the voltage applying unit to output the voltage by the value input through the inputting unit before a start of the image forming job regardless of a type of the sheet.

13. The image forming system according to claim 10, wherein the selecting unit is a display unit configured to display a screen for a user to select either the first mode or the second mode.

14. The image forming system according to claim 10, wherein the selecting unit selects either the first mode or the second mode based on a type of the sheet.

15. The image forming system according to claim 10, further comprising an environment detecting unit configured to detect an environmental condition, wherein the selecting unit selects either the first mode or the second mode based on a detecting result of the environment detecting unit.

16. The image forming system according to claim 10, further comprising a detecting unit configured to detect a voltage applied to the charge applying member or a current flowing through the charge applying member, wherein the selecting unit selects either the first mode or the second mode based on a detecting result of the detecting unit.

17. The image forming system according to claim 10, further comprising a current detecting unit configured to detect a current flowing through the charge applying member, wherein, in the changing process, the controller changes the voltage to be output by the voltage applying unit based on a detecting result of the current detecting unit when the sheet passes through the charge applying member.

18. The image forming system according to claim 10, further comprising an environment detecting unit configured to detect an environmental condition, wherein, in the changing process, the controller changes the value of the voltage to be output by the voltage applying unit based on a detecting result of the environment detecting unit during the execution of the charge adjusting operation.

19. The image forming system according to claim 10, wherein, in the changing process, the controller changes the value of the voltage to be output by the voltage applying unit based on a number of sheets conveyed during the execution of the charge adjusting operation.

20. The image forming system according to claim 10, wherein, in the second mode, the controller provides information prompting a user to reset the voltage to be applied to the charge applying member in a case in which a difference between the value of the voltage output by the voltage applying unit during the execution of the charge adjusting operation and a value calculated by the controller as a suitable voltage value for applying to the charge applying member during the execution of the charge adjusting operation exceeds a predetermined permissible range.

21. The image forming system according to claim 1, wherein the controller is capable of executing a changing process in which a voltage to be output by the voltage applying unit in a charge adjusting operation in which a charge state of the sheet on which the image is formed in an image forming job is changed from the voltage according to the voltage information input by the inputting unit during execution of the charge adjusting operation.

22. The image forming system according to claim 10, wherein the controller is capable of executing a changing process in which a voltage to be output by the voltage applying unit in a charge adjusting operation in which a charge state of the sheet on which the image is formed in an image forming job is changed from the voltage according to the voltage information input by the inputting unit during execution of the charge adjusting operation.

23. The image forming system according to claim 1, wherein the charge applying member is configured to eliminate charge of a sheet in contact with the sheet.

24. The image forming system according to claim 10, wherein the charge applying member is configured to eliminate charge of a sheet in contact with the sheet.

* * * * *